(12) United States Patent
Campbell

(10) Patent No.: US 10,378,956 B2
(45) Date of Patent: Aug. 13, 2019

(54) SYSTEM AND METHOD FOR REDUCING FALSE POSITIVES CAUSED BY AMBIENT LIGHTING ON INFRA-RED SENSORS, AND FALSE POSITIVES CAUSED BY BACKGROUND VIBRATIONS ON WEIGHT SENSORS

(71) Applicant: Triangle Strategy Group, LLC, Raleigh, NC (US)

(72) Inventor: Patrick Joseph Campbell, Raleigh, NC (US)

(73) Assignee: TRIANGLE STRATEGY GROUP, LLC, Raleigh, NC (US)

( * ) Notice: Subject to any disclaimer, the term of this patent is extended or adjusted under 35 U.S.C. 154(b) by 0 days.

(21) Appl. No.: 14/145,561

(22) Filed: Dec. 31, 2013

(65) Prior Publication Data

US 2014/0110584 A1   Apr. 24, 2014

Related U.S. Application Data

(63) Continuation-in-part of application No. 13/422,736, filed on Mar. 16, 2012, now Pat. No. 9,727,838.
(Continued)

(51) Int. Cl.
*G01J 1/42* (2006.01)
*G06Q 10/08* (2012.01)
*G06Q 30/02* (2012.01)

(52) U.S. Cl.
CPC ............... *G01J 1/42* (2013.01); *G06Q 10/087* (2013.01); *G06Q 30/0261* (2013.01); *G01J 1/4204* (2013.01)

(58) Field of Classification Search
CPC ..... G06Q 20/203; G06Q 10/087; G06Q 10/08
(Continued)

(56) References Cited

U.S. PATENT DOCUMENTS

| | | |
|---|---|---|
| 4,212,361 A | 7/1980 | Stocker |
| 4,660,160 A | 4/1987 | Tajima et al. |
| 4,819,015 A | 4/1989 | Bullivant et al. |
| 4,925,038 A | 5/1990 | Gajewski |
| 5,000,274 A | 3/1991 | Bullivant |
| 5,376,948 A | 12/1994 | Roberts |
| 5,450,971 A | 9/1995 | Boron et al. |

(Continued)

FOREIGN PATENT DOCUMENTS

| | | |
|---|---|---|
| JP | 05-135084 A | 6/1993 |
| JP | 05-278817 A | 10/1993 |

(Continued)

OTHER PUBLICATIONS

Notification of Transmittal of the International Search Report and the Written Opinion of the International Searching Authority, or the Declaration for International Application No. PCT/US2014/072776 (dated Mar. 12, 2015).

(Continued)

*Primary Examiner* — Octavian Rotaru

(57) ABSTRACT

The subject matter described herein includes methods, systems, and computer readable media for tracking consumer interactions with products using electromagnetic beam sensors. One system includes at least one transmitter configured to generate a beam of electromagnetic energy. The system further includes at least one receiver positioned with respect to the at least one transmitter to detect a portion of the beam of electromagnetic energy reflected from a consumer or a product when the consumer physically interacts with the product. The system further includes the at least one circuit board on which the at least one transmitter and the at least one receiver are mounted. The at least one circuit board is configured to mount at or near a product location.

10 Claims, 21 Drawing Sheets

Related U.S. Application Data

(60) Provisional application No. 61/748,352, filed on Jan. 2, 2013, provisional application No. 61/453,942, filed on Mar. 17, 2011.

(58) Field of Classification Search
USPC .................................................. 705/22, 28
See application file for complete search history.

(56) References Cited

U.S. PATENT DOCUMENTS

| | | |
|---|---|---|
| 5,549,373 A | 8/1996 | Bustos |
| 5,645,182 A | 7/1997 | Miller, Jr. et al. |
| 5,781,443 A * | 7/1998 | Street ............... G05B 19/41805 414/273 |
| 6,142,375 A * | 11/2000 | Belka .................... G06T 7/0008 235/454 |
| 6,184,521 B1 | 2/2001 | Coffin, IV et al. |
| 6,296,523 B1 | 10/2001 | Sasai |
| 6,332,575 B1 * | 12/2001 | Schuessler ......... G06K 7/10693 235/462.13 |
| 6,588,606 B2 | 7/2003 | Miller, Jr. et al. |
| 6,688,478 B2 | 2/2004 | Miller, Jr. et al. |
| 6,752,277 B1 | 6/2004 | Sempliner |
| 6,877,618 B2 | 4/2005 | Mason |
| 6,878,896 B2 * | 4/2005 | Braginsky ............... B07C 7/005 209/546 |
| 6,886,746 B1 | 5/2005 | Edwards |
| 7,322,520 B2 | 1/2008 | Warden et al. |
| 7,516,848 B1 * | 4/2009 | Shakes ...................... B07C 5/38 209/34 |
| 7,561,717 B2 * | 7/2009 | Anderson .......... G06K 17/0022 235/462.13 |
| 7,584,016 B2 | 9/2009 | Weaver |
| 7,693,757 B2 | 4/2010 | Zimmerman |
| 7,994,914 B2 | 8/2011 | Irmscher et al. |
| 8,025,187 B2 | 9/2011 | Sottosanti, Jr. et al. |
| 8,651,288 B2 | 2/2014 | Squitieri |
| 2002/0161651 A1 | 10/2002 | Godsey et al. |
| 2003/0001223 A1 | 1/2003 | Gremm |
| 2003/0038099 A1 | 2/2003 | Bauman et al. |
| 2004/0098298 A1 | 5/2004 | Yin |
| 2004/0254759 A1 | 12/2004 | Kubach et al. |
| 2005/0103850 A1 * | 5/2005 | Mergenthaler ....... G06K 7/1096 235/462.08 |
| 2005/0131578 A1 | 6/2005 | Weaver |
| 2005/0171854 A1 * | 8/2005 | Lyon .................. G01G 19/4144 705/24 |
| 2005/0177423 A1 | 8/2005 | Swanson, Sr. |
| 2005/0270149 A1 | 12/2005 | Standing |
| 2005/0286220 A1 | 12/2005 | Moore et al. |
| 2006/0071774 A1 | 4/2006 | Brown et al. |
| 2006/0092042 A1 | 5/2006 | Davis et al. |
| 2006/0216138 A1 * | 9/2006 | Schaefer ................ B65G 1/137 414/266 |
| 2006/0238307 A1 | 10/2006 | Bauer et al. |
| 2007/0050271 A1 * | 3/2007 | Ufford ................. G06Q 10/087 705/28 |
| 2007/0067203 A1 | 3/2007 | Gil et al. |
| 2007/0193971 A1 | 8/2007 | Hardy et al. |
| 2007/0255665 A1 | 11/2007 | Oosugi et al. |
| 2008/0077511 A1 * | 3/2008 | Zimmerman .......... G06Q 10/00 705/28 |
| 2008/0082360 A1 | 4/2008 | Bailey et al. |
| 2008/0159634 A1 | 7/2008 | Sharma et al. |
| 2008/0186167 A1 * | 8/2008 | Ramachandra ...... G06Q 10/087 340/539.21 |
| 2008/0186174 A1 | 8/2008 | Alexis et al. |
| 2009/0179753 A1 | 7/2009 | Bonner et al. |
| 2009/0192921 A1 | 7/2009 | Hicks |
| 2009/0207022 A1 * | 8/2009 | Reckeweg et al. ........ 340/572.1 |
| 2009/0233714 A1 | 9/2009 | Toro |
| 2009/0294479 A1 | 12/2009 | Sottosanti, Jr. et al. |
| 2010/0010868 A1 | 1/2010 | Aimone Catti |
| 2010/0023300 A1 | 1/2010 | Farry et al. |
| 2010/0065632 A1 | 3/2010 | Babcock et al. |
| 2010/0139989 A1 * | 6/2010 | Atwater ............. G01G 19/4144 177/245 |
| 2010/0327164 A1 | 12/2010 | Costello et al. |
| 2011/0010275 A1 | 1/2011 | Hull |
| 2011/0084627 A1 * | 4/2011 | Sloan ...................... F21S 4/003 315/297 |
| 2012/0185590 A1 | 7/2012 | Kolin et al. |
| 2012/0245969 A1 | 9/2012 | Campbell |
| 2013/0117053 A2 | 5/2013 | Campbell |
| 2014/0110584 A1 | 4/2014 | Campbell |
| 2014/0114708 A1 | 4/2014 | Campbell |
| 2014/0289009 A1 | 9/2014 | Campbell |
| 2015/0184997 A1 | 7/2015 | Campbell |

FOREIGN PATENT DOCUMENTS

| | | |
|---|---|---|
| JP | 09-288764 A | 11/1997 |
| JP | 2008-247558 A | 10/2008 |
| KR | 10-1998-0074218 A | 11/1998 |
| KR | 10-0935341 B1 | 1/2010 |
| WO | WO 2012/125960 A2 | 9/2012 |
| WO | 2014107457 A1 | 7/2014 |
| WO | WO 2014/107462 A1 | 7/2014 |

OTHER PUBLICATIONS

Commonly-assigned, co-pending U.S. Appl. No. 14/586,389 for "Methods, Systems, and Computer Readable Media for Tracking Human Interactions With Objects Using Modular Sensor Segments," (Unpublished, filed Dec. 30, 2014).

Non-Final Office Action for U.S. Appl. No. 13/422,736 (dated Dec. 2, 2014).

First Examination Report for New Zealand Patent Application No. 614984 (dated Jul. 14, 2014).

Non-Final Office Action for U.S. Appl. No. 13/422,736 (dated Jul. 18, 2014).

Notification of Transmittal of the International Search Report and the Written Opinion of the International Searching Authority, or the Declaration for International Application No. PCT/US2013/078529 (dated Apr. 29, 2014).

Notification of Transmittal of the International Search Report and the Written Opinion of the International Searching Authority, or the Declaration for International Application No. PCT/US2013/078509 (dated Apr. 24, 2014).

Communication of European Publication Number and Information on the Application of Article 67(3) EPC for European Patent Application No. 12717507.3 (dated Jan. 15, 2014).

"Snackmaker Modernizes the Impulse Buy with Sensors, Analytics," CIO Journal, The Wall Street Journal, pp. 1-3 (Oct. 11, 2013).

Notification of Transmittal of the International Search Report and the Written Opinion of the International Searching Authority, or the Declaration for International Application No. PCT/US12/29518 (dated Sep. 21, 2012).

Interview Summary dated Mar. 18, 2015 for corresponding U.S. Appl. No. 13/422,736, filed Mar. 16, 2012.

Office Action dated Apr. 24, 2015 for corresponding U.S. Appl. No. 14/586,389, filed Dec. 30, 2014.

Final Office Action dated Jun. 24, 2015 from corresponding U.S. Appl. No. 13/422,736, filed Mar. 16, 2012.

Non-Final Office Action dated Mar. 23, 2016 for U.S. Appl. No. 13/422,736.

Non-Final Office Action dated Aug. 29, 2016 for U.S. Appl. No. 14/145,649.

Final Office Action dated Jan. 21, 2016 for U.S. Appl. No. 14/586,389.

Non-Final Office Action dated Apr. 28, 2016 for U.S. Appl. No. 14/586,389.

* cited by examiner

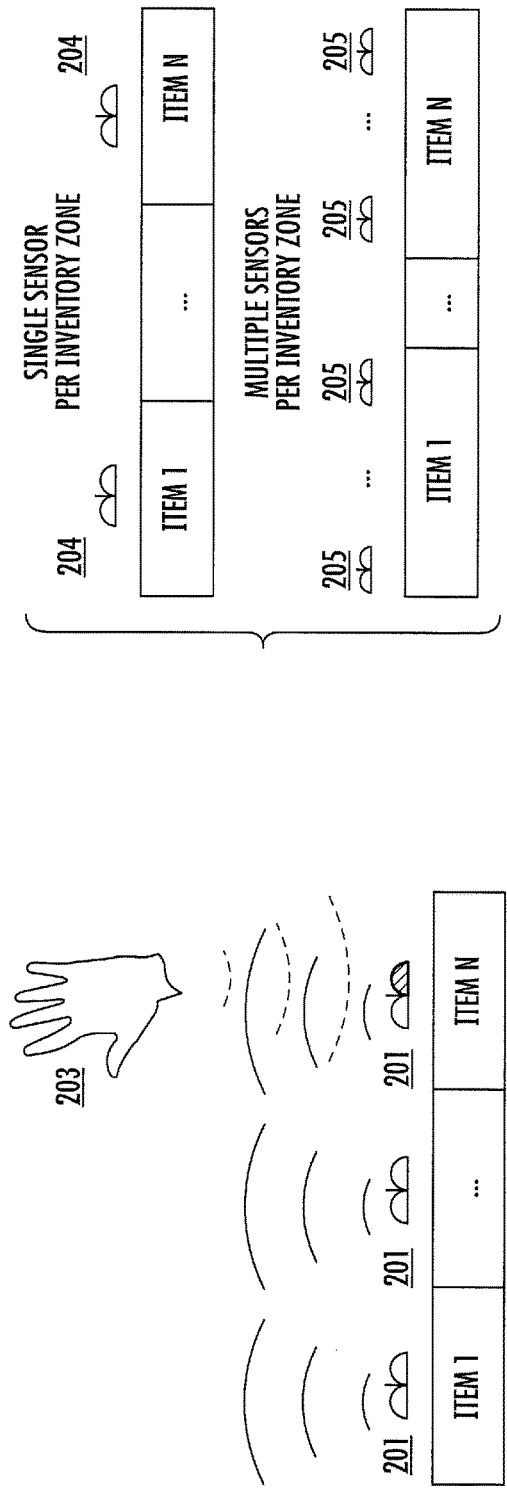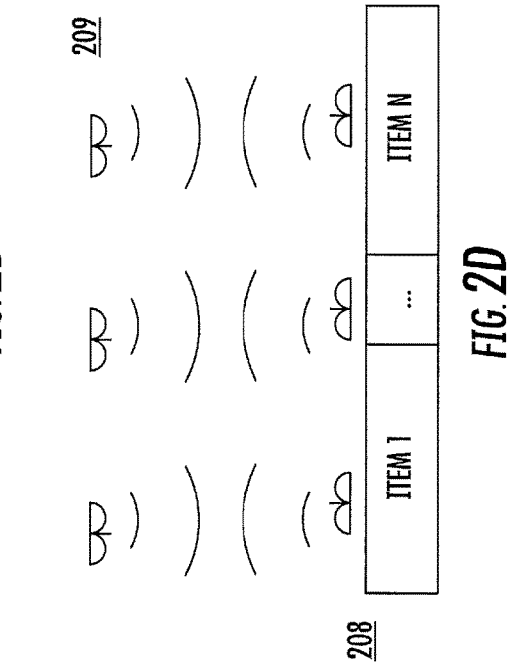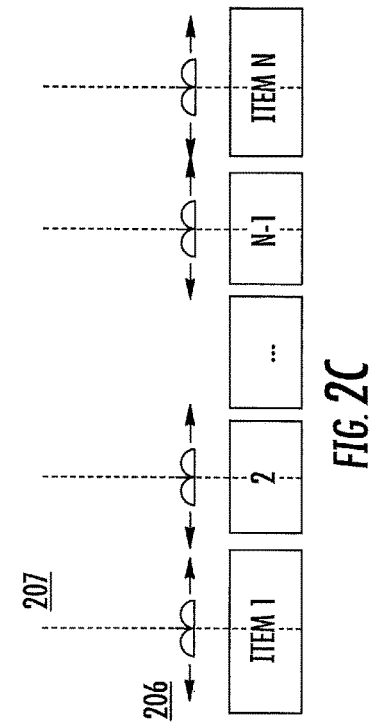
FIG. 2A
FIG. 2B
FIG. 2C
FIG. 2D

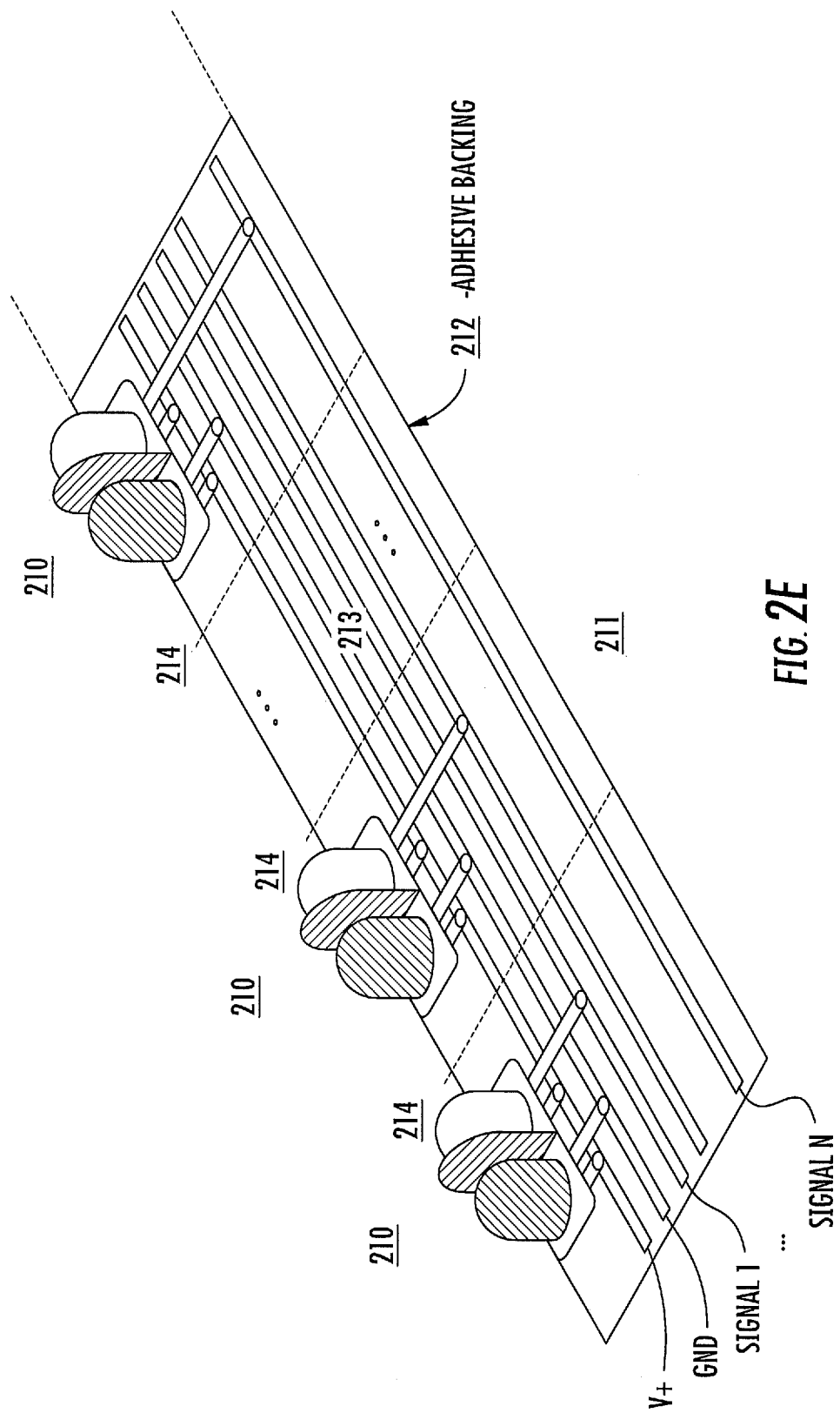

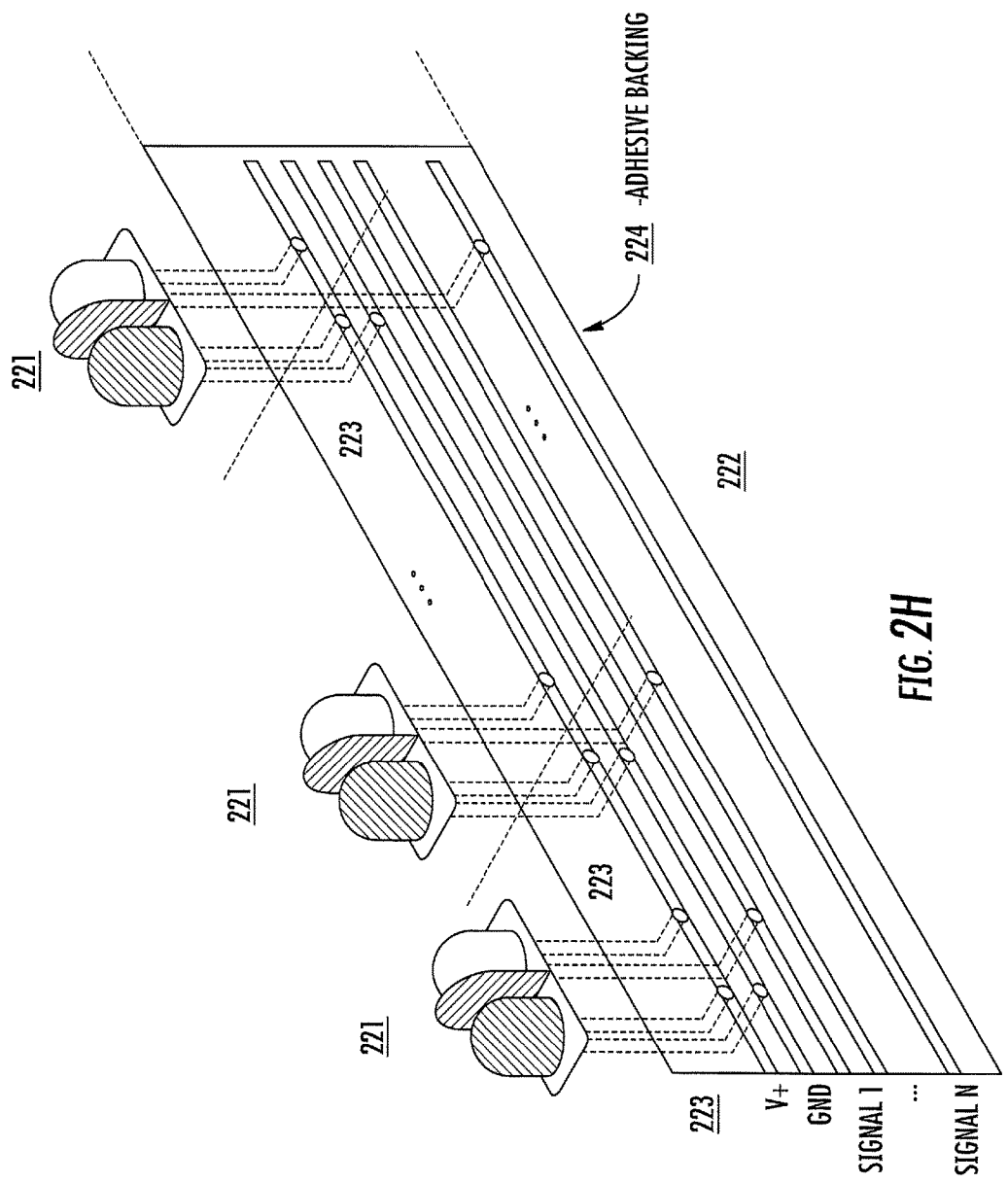

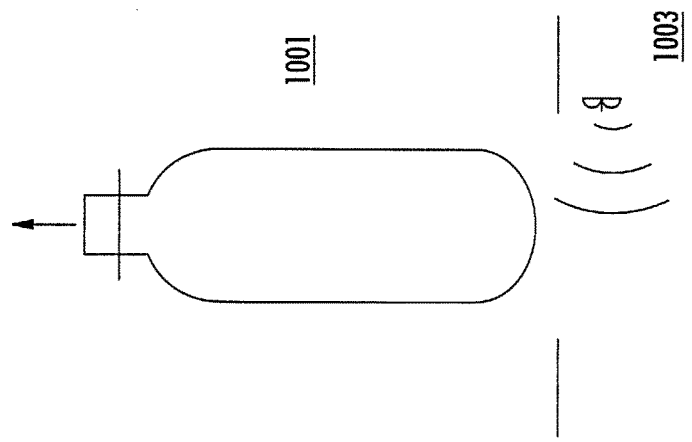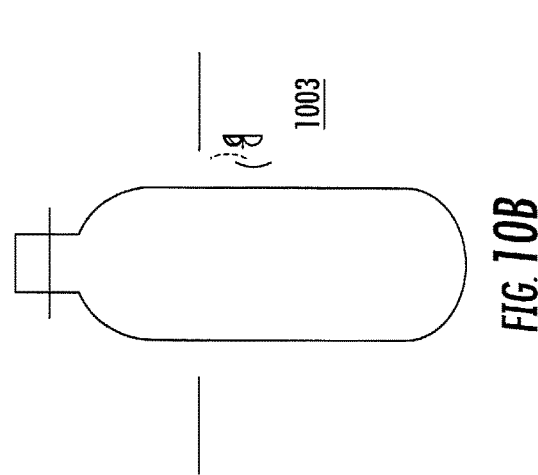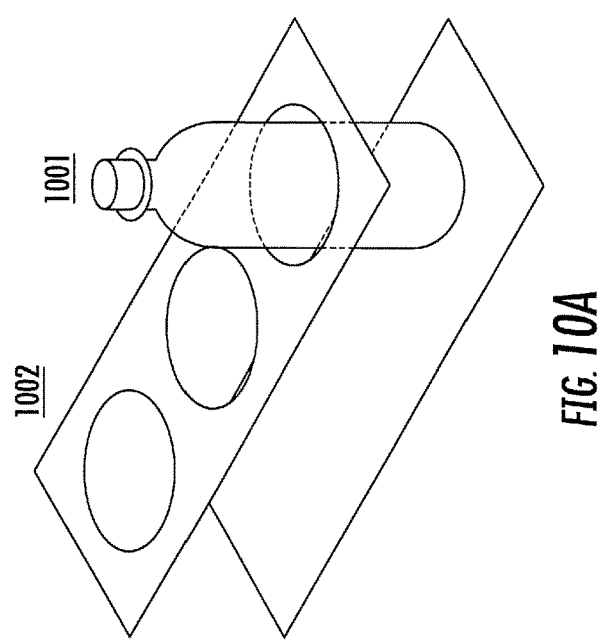

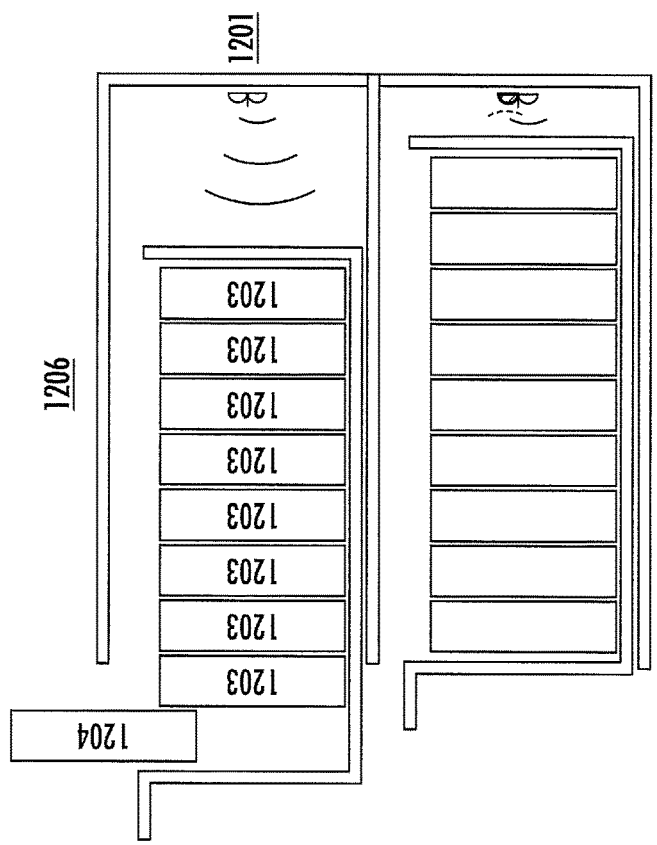
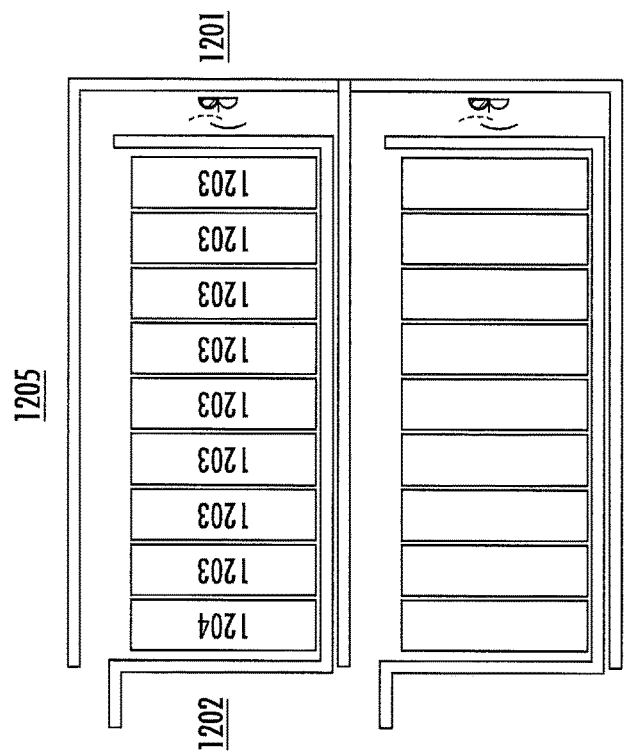
FIG. 12A
FIG. 12B

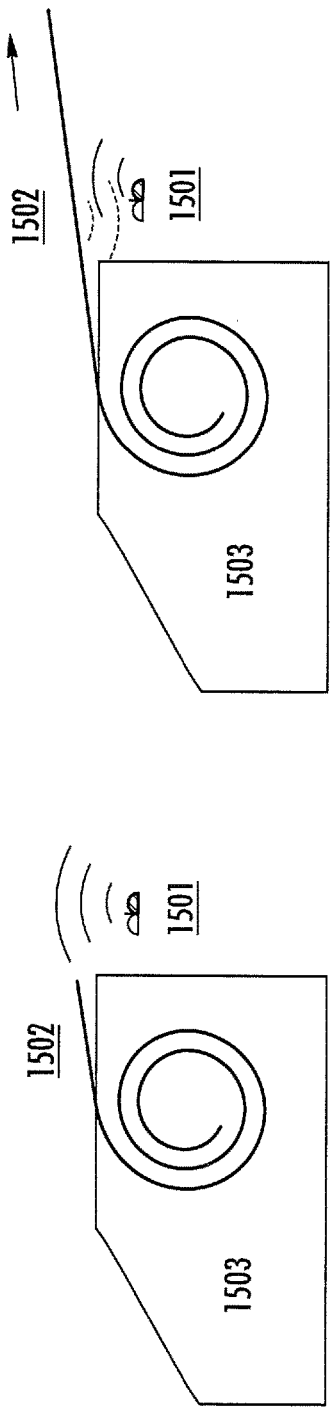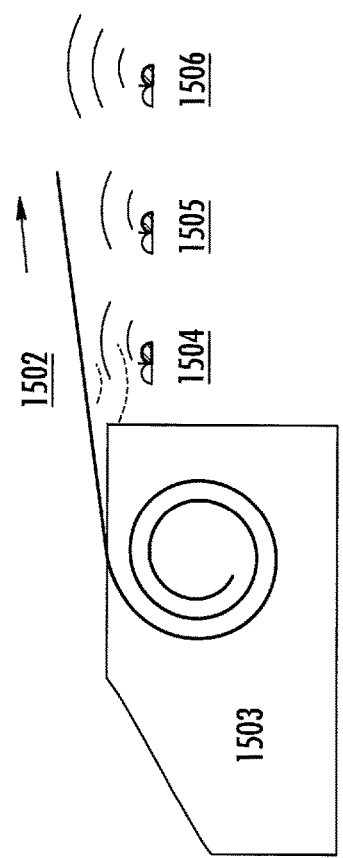

SYSTEM AND METHOD FOR REDUCING FALSE POSITIVES CAUSED BY AMBIENT LIGHTING ON INFRA-RED SENSORS, AND FALSE POSITIVES CAUSED BY BACKGROUND VIBRATIONS ON WEIGHT SENSORS

PRIORITY CLAIM

This application claims the benefit of U.S. Provisional Patent Application No. 61/748,352, filed Jan. 2, 2013, the disclosure of which is incorporated herein by reference in its entirety. This application is a continuation-in-part of U.S. patent application Ser. No. 13/422,736, filed Mar. 16, 2012, which claims the benefit of U.S. Provisional Patent Application No. 61/453,942, filed Mar. 17, 2011, the disclosures of which are incorporated by reference.

TECHNICAL FIELD

This disclosure relates to systems for tracking consumer interactions with retail products on merchandising fixtures in real time.

BACKGROUND

Consumer packaged goods (CPG) retailers and manufacturers are under continuous pressure to improve operational efficiencies, given intense competition, smaller profit margins and ever-increasing operational costs. Manufacturers and retailers work with a fixed amount of retail space and seek to maximize the productivity of that space in order to maximize revenues while controlling costs. Retailers seek to maximize overall revenues through optimal placement of top-performing existing store keeping units (SKUs), proper placement of new SKUs and elimination of less productive SKUs. This usually places a high demand on available shelf space and creates significant competition for shelf space in CPG retail stores. Both retailers and manufacturers commit significant data gathering and analysis to optimizing the productivity of that space.

Currently, CPG manufacturers and retailers use various product tracking techniques, including collecting scanner data from the systems of the retailers, and data consolidated by vendors such as Nielsen® or Information Resources, Inc. (IRI®). There are two limitations to using just scanner data, namely, (1) aggregation and (2) time. In terms of aggregation, scanner data is usually available at store level or at a national chain level (e.g., Kroger®, and Safeway®). In terms of time, data is typically available daily, weekly, or monthly. Because of these two limitations, testing of new products or merchandising arrangements must be done across a large number of stores and over a long period of time (e.g., weeks or months) to accurately detect the effect of the change. These limitations incur significant costs (e.g., typically testing of a new product or new merchandising arrangement requires 20+ stores over 2-3 months for any given "cell" in a test) and limit the number of experimental cells that can be executed. Hence, many valuable experiments that could be conducted are precluded by cost considerations, slowing the overall learning process by retailers and manufacturers and resulting in inefficient use of space.

Therefore, a need exists to address the problems noted above and other problems previously experienced.

SUMMARY

The subject matter described herein includes methods, systems, and computer readable media for tracking consumer interactions with products using electromagnetic beam sensors. One system includes at least one transmitter configured to generate a beam of electromagnetic energy. The system further includes at least one receiver positioned with respect to the at least one transmitter to detect a portion of the beam of electromagnetic energy reflected from a consumer or a product when the consumer physically interacts with the product. The system further includes the at least one circuit board on which the at least one transmitter and the at least one receiver are mounted. The at least one circuit board is configured to mount at or near a product location.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter herein will now be explained with reference to the accompanying drawings of which:

FIG. 2A is a schematic diagram illustrating a vertical infrared curtain in front of a merchandising unit, where the curtain is produced by an array of electromagnetic beam sensors according to an embodiment of the subject matter described herein;

FIG. 2B is a schematic diagram illustrating single versus multiple sensors per inventory zone according to an embodiment of the subject matter described herein;

FIG. 2C is a schematic diagram illustrating sliding sensors adjustable to the center of each inventory zone according to an embodiment of the subject matter described herein;

FIG. 2D is a schematic diagram illustrating options to project beams from the bottom and/or top of an inventory zone using electromagnetic beam sensors according to an embodiment of the subject matter described herein;

FIG. 2E is a schematic diagram illustrating electromagnetic beam sensors mounted on a flexible circuit board according to an embodiment of the subject matter described herein;

FIG. 2H is a schematic diagram illustrating a flexible circuit strip allowing projection and detection of infrared energy in the plane of the strip according to an embodiment of the subject matter described herein;

FIGS. 10A-10C are schematic diagrams illustrating an electromagnetic beam sensor positioned in a product cell array to detect insertion and removal from the cell array according to an embodiment of the subject matter described herein;

FIGS. 12A and 12B are schematic diagrams illustrating electromagnetic beam sensors positioned inside of a drawer to detect product insertion and removal from the drawer according to an embodiment of the subject matter described herein;

FIGS. 15A-15C illustrate electromagnetic beam sensors positioned near a receipt printer according to an embodiment of the subject matter described herein.

DETAILED DESCRIPTION

Figure 1A:
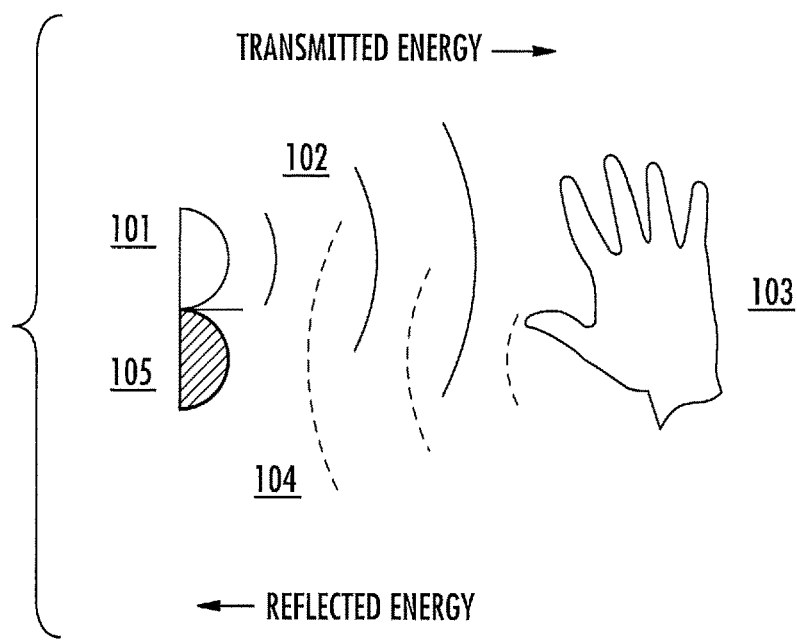
FIG. 1A is a schematic diagram illustrating detection of an object by a diffuse beam of infrared energy according to an embodiment of the subject matter described herein.

This disclosure relates to systems for tracking consumer interactions with retail products on merchandising fixtures in real time.

Described herein are novel applications of infrared and other types of sensors to study consumer interactions that produce the following benefits: versatile to track interactions with a broad range of package types and merchandising configuration; detection of items that do not have significant weight (e.g. financial services leaflets, phone cards, etc. . . . ); produce consistent and reproducible readings; accurately detect real interactions and avoid false positives induced by either people or store environment; do not require adulteration of product (for example as with RFID sensing); small form factor hardware allowing for rapid and discrete installation; high reliability and extended service life; and low cost equipment.

Also, described herein is an example consumer tracking system (CTS), such as an on-shelf tracking (OST) system, using reflected energy sensors to monitor shopper interactions with product in an inventory zone. In these arrangements the reflection of energy on a shopper's hand, arm, or product item may be detected. Direct contact with the sensor may not be required, promoting extended service life. While the description below refers to infrared energy, it should be noted that any form of energy capable of being reflected and detected (for example ultrasonic) may be used.

Also, the CTS can track consumer activity with respect to individual retail product units from a retail carton, while the retail carton may be positioned on an array of sensors mounted on or in close proximity to a retail display shelf of a merchandising fixture. The CTS's various product sensors provide a way to determine when a consumer interacts with a retail product unit positioned on a retail shelf, a description of the interaction, and stores information about the interaction as an event in an event log for later retrieval and analysis. The retail product unit may be the smallest increment of retail product offered by a retailer for purchase (e.g., a single pack of Wrigley® Five Rain gum, 15 sticks). The retail carton, also referred to as a product container, may contain retail product units in a standard number and configuration (e.g., 10 ct box of Wrigley® Five Rain gum). Multiple retail cartons containing the same product may be grouped together into an inventory zone. The merchandising fixture may display retail products to consumers in an appealing fashion. Example merchandising fixtures include a checkout shelf, a peg hook, an aisle shelf, and a temporary cardboard display.

Infrared reflectance sensors may be used to monitor shopper interactions with products in an inventory zone. In these arrangements the reflection of infrared energy on the shoppers hand, arm, or product item may be detected. In these arrangements, there is no direct contact between the sensor and either product of the shopper, thus promoting extended service life.

The system can be better understood with reference to the following drawings and description. The elements in the figures are not necessarily to scale, emphasis instead being placed upon illustrating the principles of the system. In the figures, like-referenced numerals designate corresponding parts throughout the different views.

FIG. 1A illustrates detection of an object by a diffuse beam of infrared energy. A transmitter 101 creates a diffuse beam of infrared energy 102, which illuminates any foreign object 103 entering the inventory zone. A portion of the infrared energy is reflected as a reflected beam 104 which is then detected by a receiver 105. A suitable device may include the Vishay TCRT5000 reflective sensor which includes both a transmitter and detector. The distance of the object 103 from transmitter 101 may be estimated from the strength of the reflected signal, closer objects producing a stronger reflection and vice versa.

Figure 1B:
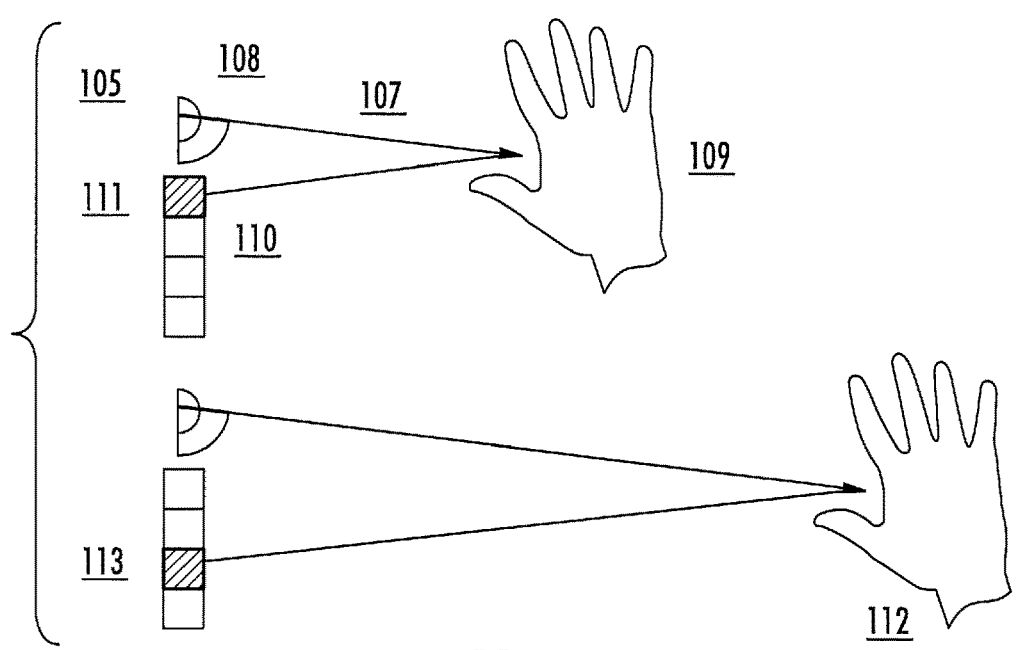
FIG. 1B is a schematic diagram illustrating detection of an object by infrared triangulation according to an embodiment of the subject matter described herein.

FIG. 1B illustrates detection of an object by infrared triangulation. A transmitter 106 produces a narrow beam 107 at an angle 108 less than 90 degrees. In the case of a nearby object 109 crossing the path of the beam, energy is reflected to a detection array 110, illuminating a portion of the detection array 111. In the case of a more distant object 112, energy is reflected to a different portion of the detection array 113. The distance of the detected object from the transmitter can be accurately estimated by the position at which the detection array is illuminated. A suitable device for this purpose may include the Sharp GP2D120XJ00F, which includes both a transmitter and a detection array in a single device.

In some embodiments reflectance sensors may be mounted immediately in front of the product so as to create a partial or full curtain.

For example, FIG. 2A shows sensors projecting a detection zone vertically. An array of sensors 201 may illuminate the area in front of and above a number of product inventory zones 202. When an object 203 enters the illuminated area, energy is reflected to the nearest of receivers 201, allowing identification of which item the shopper interacted with. Either reflectance or triangulation sensors may be used for this purpose.

In some embodiments it may be desirable to have more than one sensor per inventory zone, for example, in situations with inventory zones broader than the operative range of one sensor, or to provide redundancy.

FIG. 2B shows two different arrangements where single sensors 204 may be assigned to inventory zones and also where multiple sensors 205 may be assigned to each inventory zone.

FIG. 2C shows an arrangement where sensors on moveable mounts 206 may be repositioned to align with the center of each inventory zone 207.

FIG. 2D shows two possible arrangements for sensors. Sensors may be mounted at the bottom of the detection zone 208 offering the advantage of closest possible proximity to product and strongest signal changes. Alternatively sensors may be mounted at the top of the detection zone 209 having the advantage of discreteness, making sensors less prone to dust collection and other fouling. Either arrangement 208 or 209 may be used individually or both arrangements may be used at the same time.

Figure 2F:
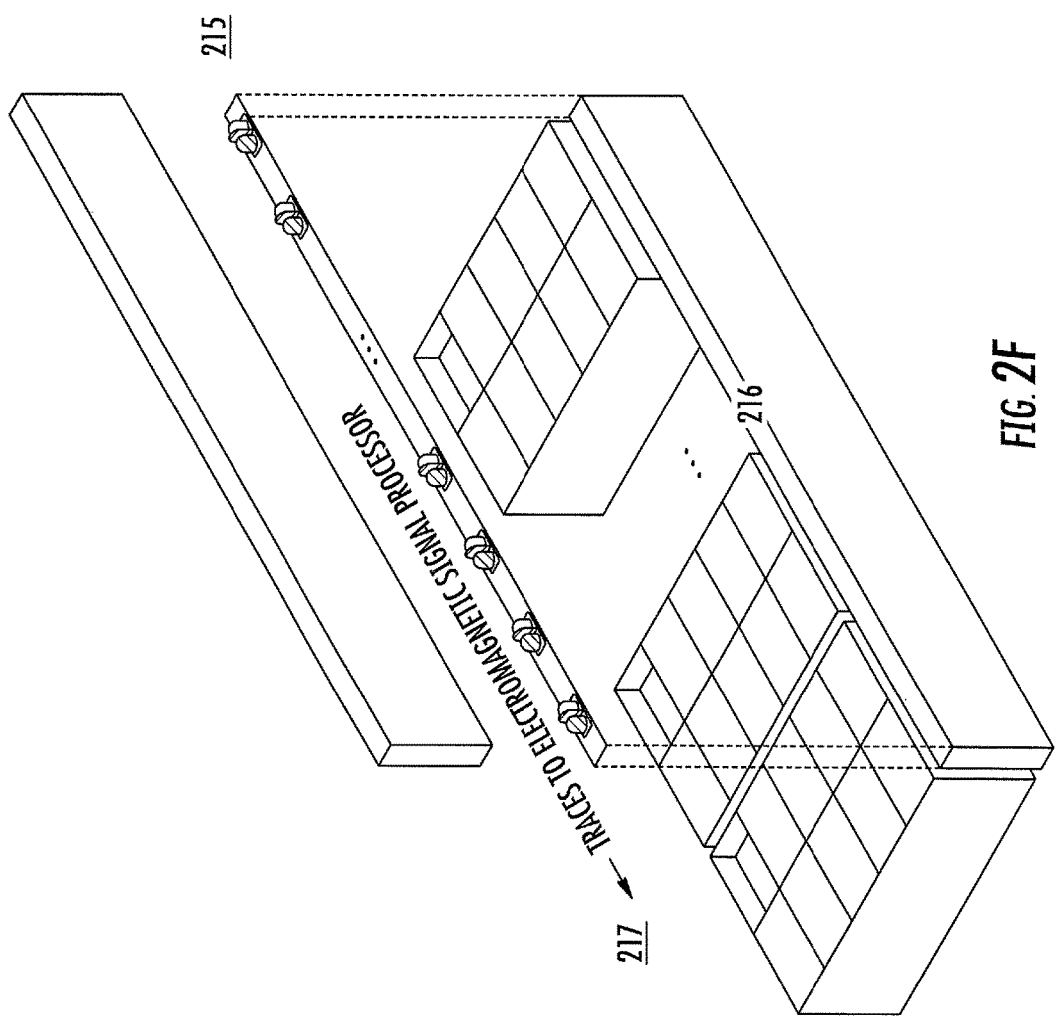
FIG. 2F is a schematic diagram illustrating a flexible circuit strip mounted on top of a shelf lip according to an embodiment of the subject matter described herein.

FIG. 2E shows an arrangement where sensors may be mounted on a flexible circuit strip. Reflectance sensors 210 may be mounted in fixed positions at regular intervals on a flexible strip 211. The strip may be a millimeter or less in thickness offering the advantage of very low form factor. The strip may be backed with adhesive 212 to allow simple mounting onto a shelf. Each strip may have traces 213 of a conductive material transmitting power to the sensors and signals from the sensors to an electromagnetic signal processor. Further each strip may be cut to length at any location 214 between sensors to fit any desired shelf width. Such strips may be mounted in at least 2 different configurations:

FIG. 2F shows a flexible circuit strip mounted on top of a shelf lip. A flexible circuit strip 215 may be mounted on top of a shelf lip 216. The strip 215 may be connected to an electromagnetic signal processor 217.

Figure 2G:
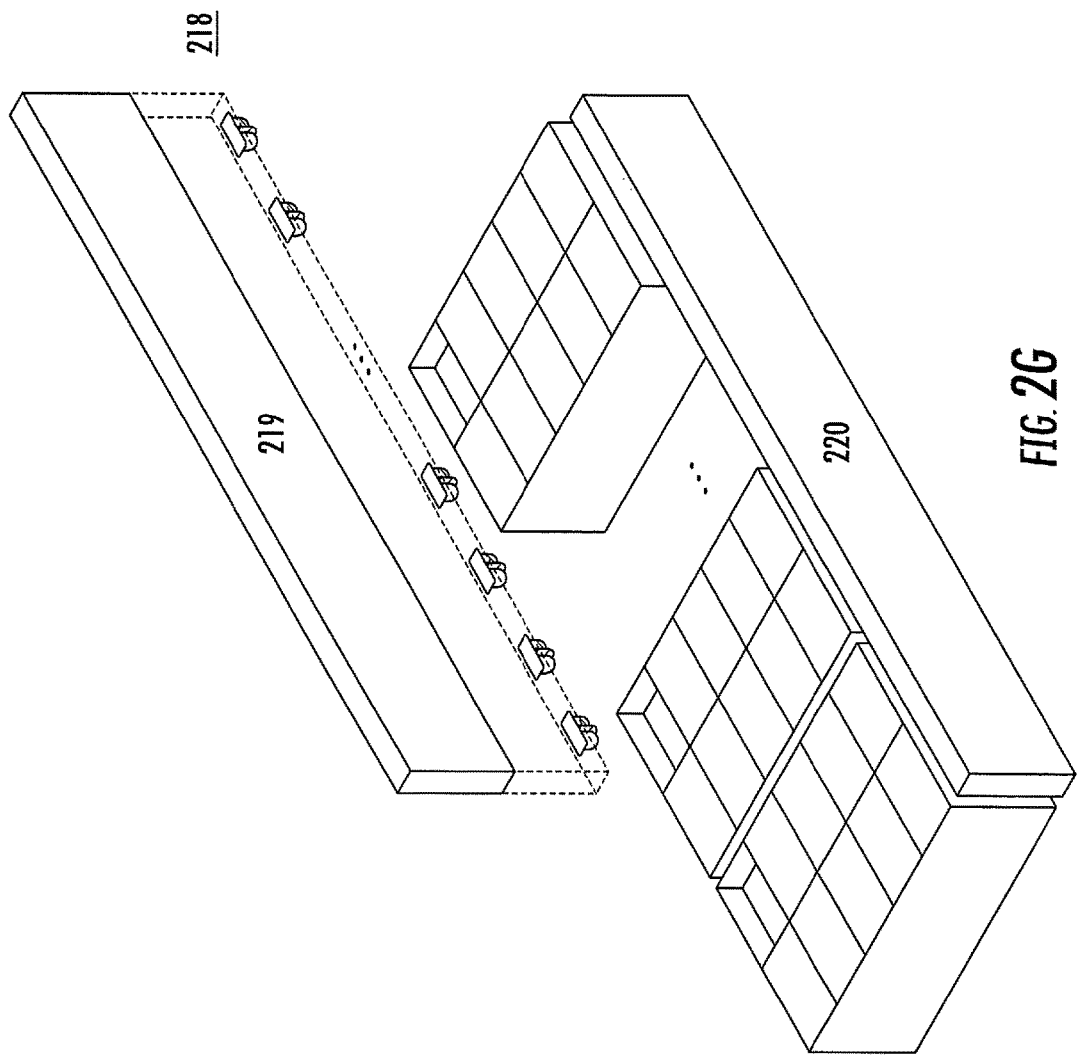
FIG. 2G is a schematic diagram illustrating a flexible circuit strip mounted below a shelf according to an embodiment of the subject matter described herein.

FIG. 2G shows a flexible circuit strip mounted below a shelf. A flexible circuit strip 218 may be mounted below a shelf 219. Sensors project a detection zone downwards so as to detect shopper activity on the shelf immediately below shelf 220.

FIG. 2H shows a further arrangement where sensors may be mounted on a flexible circuit strip with their beams oriented parallel to the plane of the strip. Reflectance sensors 221 may be mounted in fixed positions at regular intervals on a flexible strip 222. Sensor legs may be bent at an angle 223 so as to allow projection and detection of infra-red energy parallel to the plane of the strip. Sensors may be adhesive backed 224.

Figure 2I:
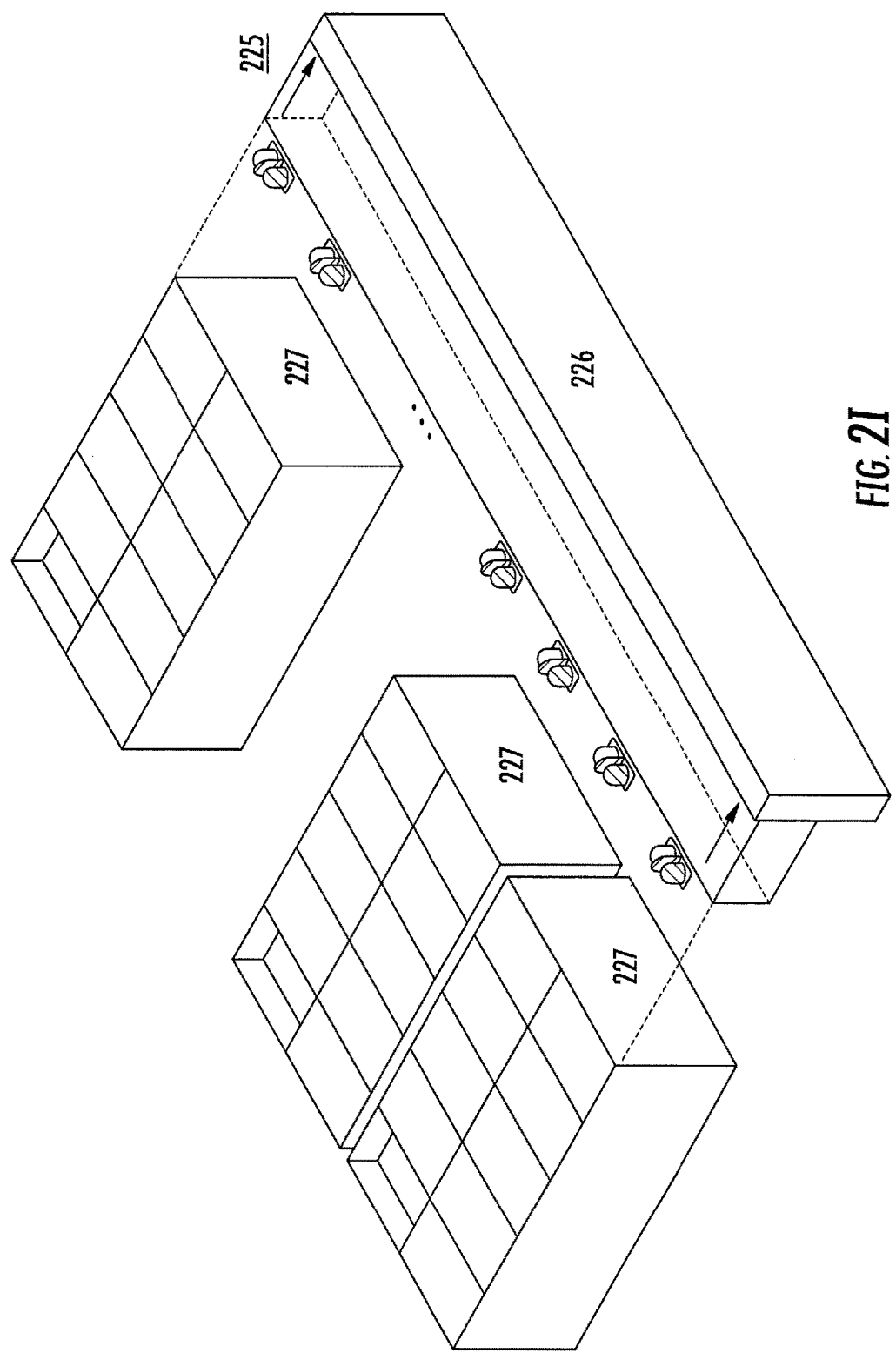
FIG. 2I is a schematic diagram illustrating a flexible circuit strip installed inside a shelf lip according to an embodiment of the subject matter described herein.

FIG. 2I shows a sensor strip in this arrangement 225 installed inside a shelf lip 226 between the shelf lip and product containers 227.

Figure 3:
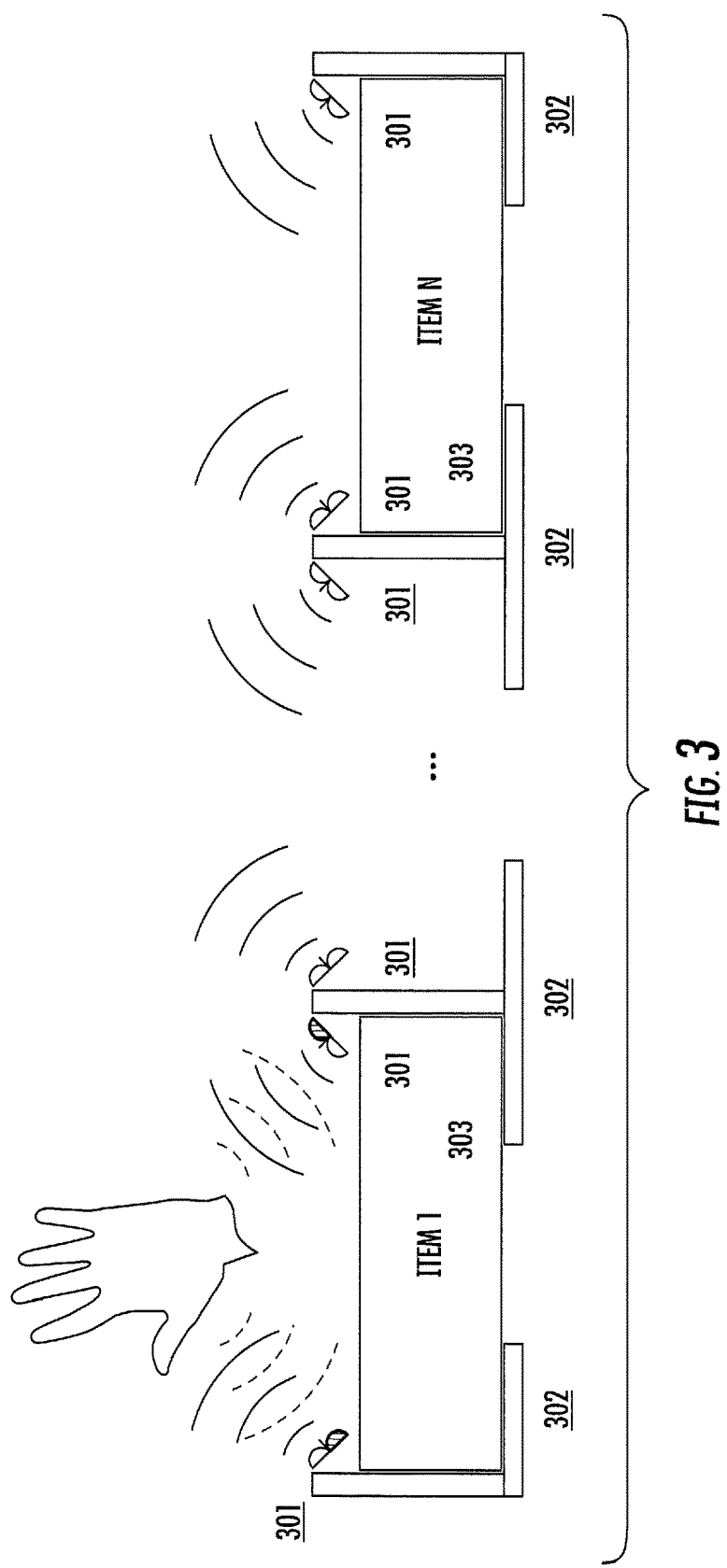
FIG. 3 is a schematic diagram illustrating electromagnetic beam sensors installed on shelf dividers according to an embodiment of the subject matter described herein.

In some embodiments, such as those illustrated by FIG. 3, sensors may be mounted on shelf dividers at an angle to the vertical, creating overlapping detection zones with two or more sensors covering a specific inventory zone. Reflectance sensors 301 may be mounted on shelf dividers 302 so as to project and detect energy at an angle to the vertical. Shelf dividers 302 serve to separate inventory zones containing different products 303 and also secure the sensors 301 in a fixed position and angle relative to the product in order to ensure repeatable measurements. Since any pickup will occur in the field of view of at least two sensors, the exact location of a pickup may be pinpointed by comparing the relative strength of signals reflected to each sensor.

Figure 4:
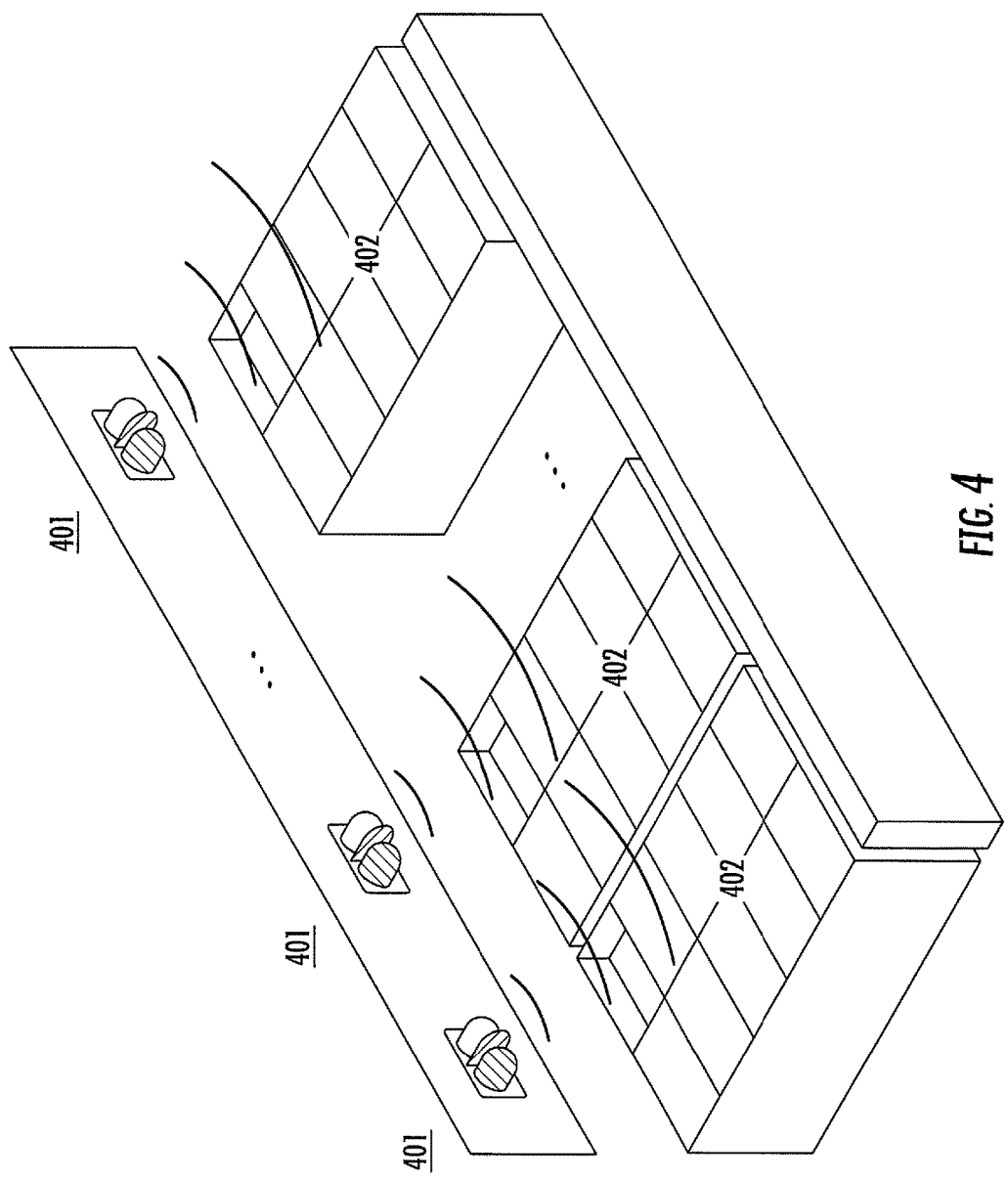
FIG. 4 is a schematic diagram illustrating electromagnetic beam sensors installed above and behind each inventory zone according to an embodiment of the subject matter described herein.

Alternatively, sensors may be mounted behind product to create a detection zone above the inventory zone as shown in FIG. 4. Reflectance sensors 401 may be mounted above and behind a number of product inventory zones 402. This mounting position confers discreteness as sensors are out of normal shopper field of view and also robustness as sensors are unlikely to be touched by shoppers.

Figure 5B:
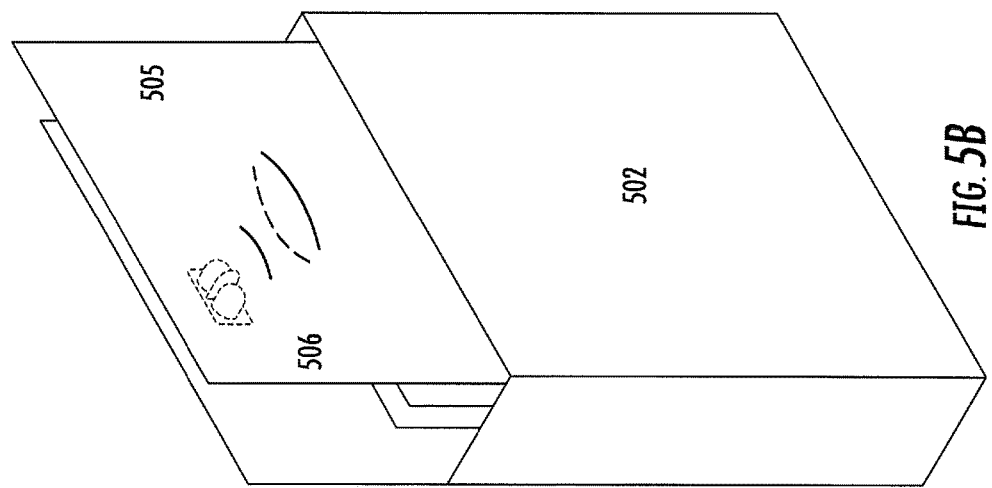
FIGS. 5A and 5B are schematic diagrams illustrating electromagnetic beam sensors detecting removal of planar objects according to an embodiment of the subject matter described herein.
Figure 5A:
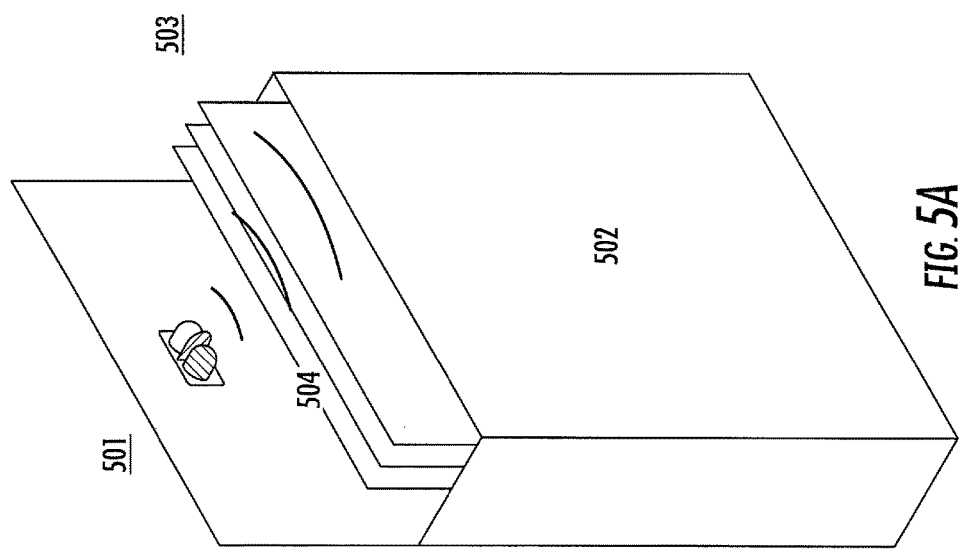

FIG. 5A shows an arrangement where reflectance sensors are used to detect the removal of planar objects. One or more sensors 501 may be mounted at the opening of an inventory zone 502 containing planar objects 503 such as magazines, leaflets, phone cards or any other planar item. Sensor 501 is oriented such that its beam 504 crosses the path of the stored objects 504. In FIG. 5B, when one of the objects 505 is removed from inventory zone 502, the infrared beam is reflected 506, allowing detection of activity.

Figure 6C:
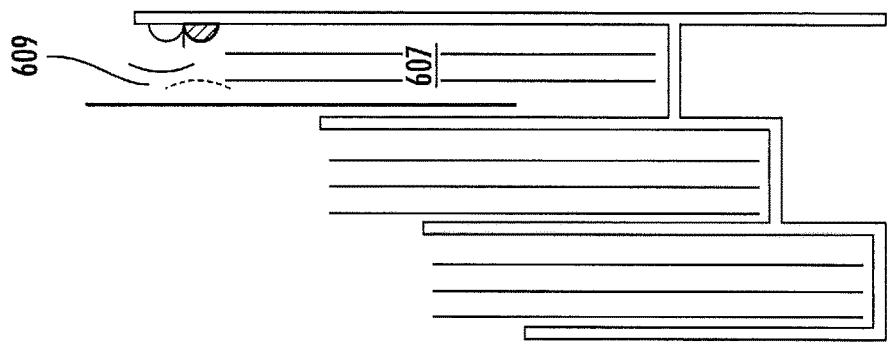
FIGS. 6A-6C are schematic diagrams illustrating the use of electromagnetic beam sensors to distinguish between removal of planar objects at different distances from the sensors according to an embodiment of the subject matter described herein.
Figure 6B:
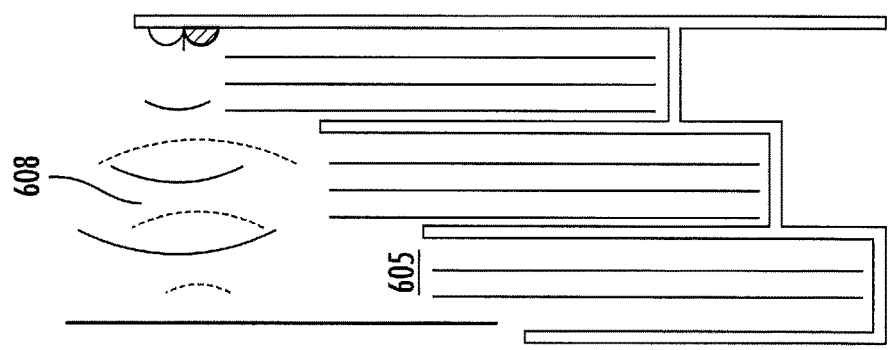
Figure 6A:
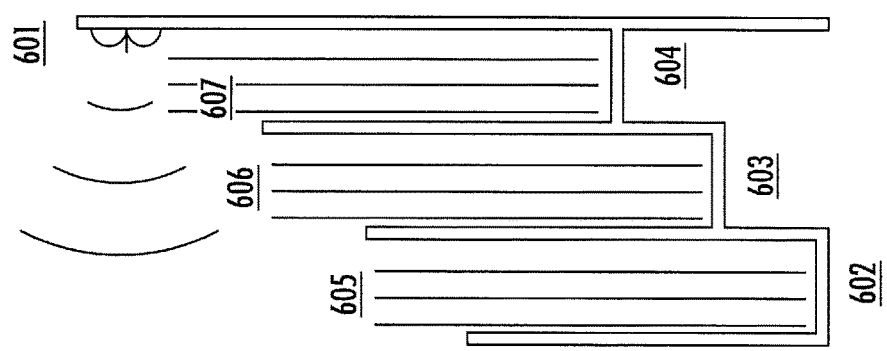

FIG. 6A shows an arrangement where reflectance sensors are used to detect and the removal of planar objects from multiple banks of storage locations and also identify the storage location. One or more sensors 601 may be mounted at the opening of several inventory zones 602, 603 and 604, positioned one in front of the other and containing different products 605, 606 and 607. When any of these items are removed from their inventory zones, the item will traverse the infrared beam.

In FIG. 6B, the most distant item 605 from the sensor is being removed, producing a reflected beam 608. In FIG. 6C, the closest item 607 to the sensor is being removed, producing a different reflected beam 609. The intensity of the measured reflection 609 will be consistently greater than that of reflection 608, so allowing accurate identification of the storage location from which the item was removed.

In some embodiments, sensors may be mounted laterally to a shelf to measure the distance of a pickup from one side of shelf. This arrangement has the advantage of monitoring a relatively large number of facings with a small number of sensors and minimal wiring, thus simplifying the networking and processing electronics.

Figure 7A:
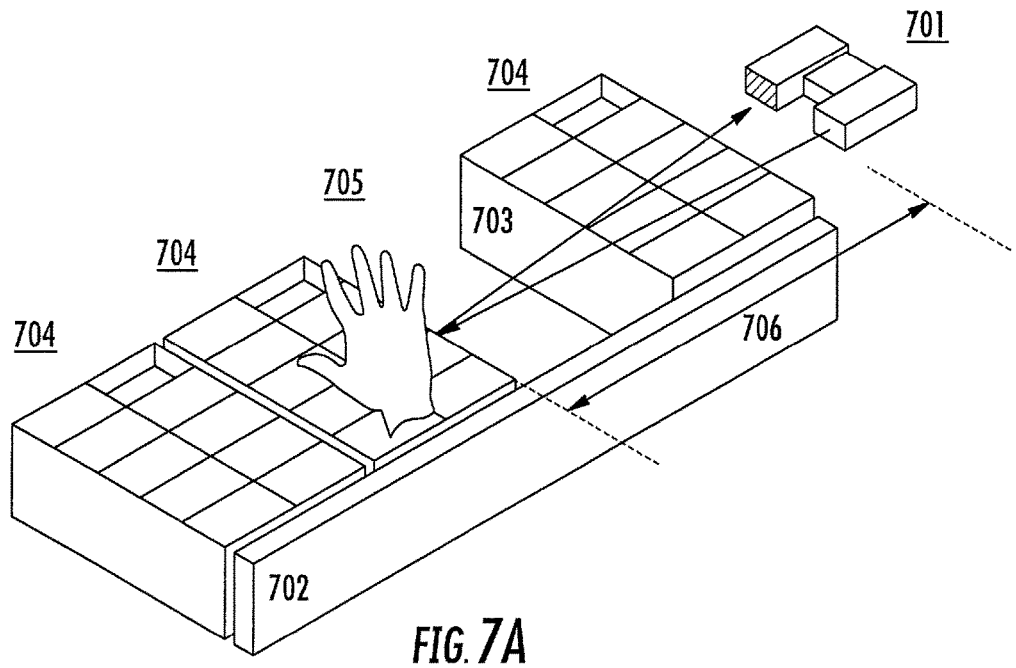
FIGS. 7A and 7B are schematic diagrams illustrating arrangements of electromagnetic beam sensors for detecting removal of planar objects at different distances according to an embodiment of the subject matter described herein.

For example, FIG. 7A shows an arrangement where a single triangulation sensor 701 is mounted at the side of a shelf 702 with the beam 703 projecting across the front of a set of inventory zones 704. On entry of an object 705 such as a shopper's hand into an inventory zone, the sensor 701 may identify the entry of the object and also measure the distance 706 of the object from the sensor. By processing the measured distance, the inventory zone from which product was handled may be identified.

Figure 7B:
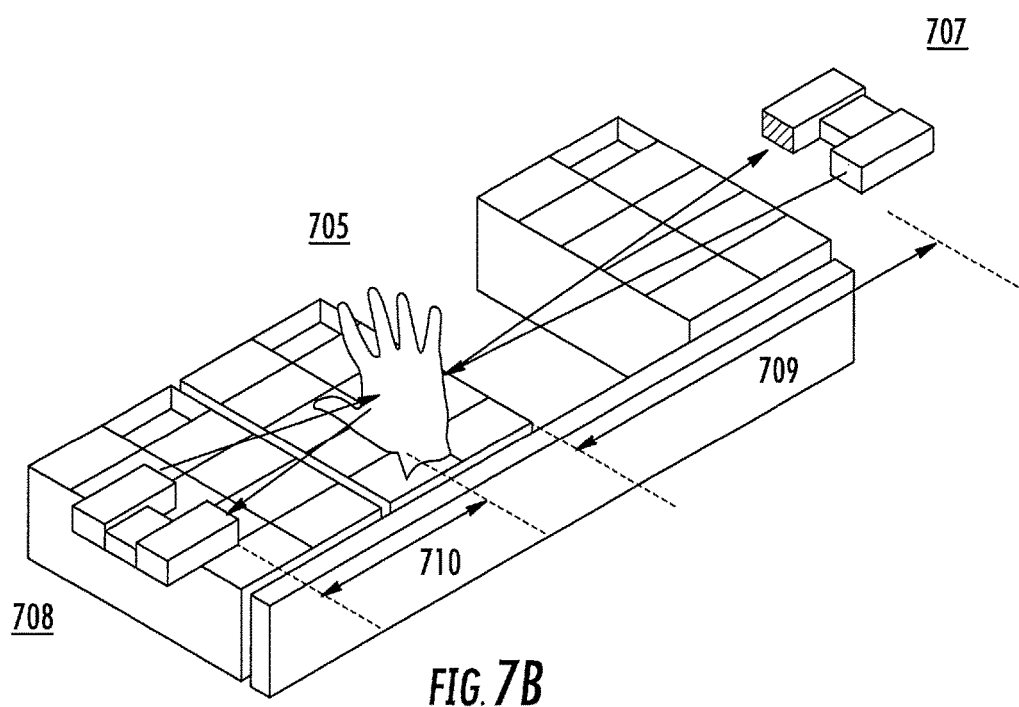

FIG. 7B shows a further arrangement where triangulation sensors 707 and 708 are used to produce two independent measurements 709 and 710 of the point of an object 705 entering a set of inventory zones. By analyzing the distance readings 709 and 710, greater accuracy and/or redundancy can be achieved in identifying the position of object 705, as well as an estimate of the size of the object since opposite edges of object 705 are measured.

In some embodiments, the sensors may be combined with an ambient lighting correction system to isolate the light being reflected from infrared transmitters. Infrared detectors will typically respond to some portion of ambient lighting and this could create false positive events, for example, by passers by moving in front of unit. By taking readings alternating with emitter subsequently on and off, it may be possible to correct for such events.

In some embodiments, the sensors may be combined with a weight sensing system.

Figure 8:
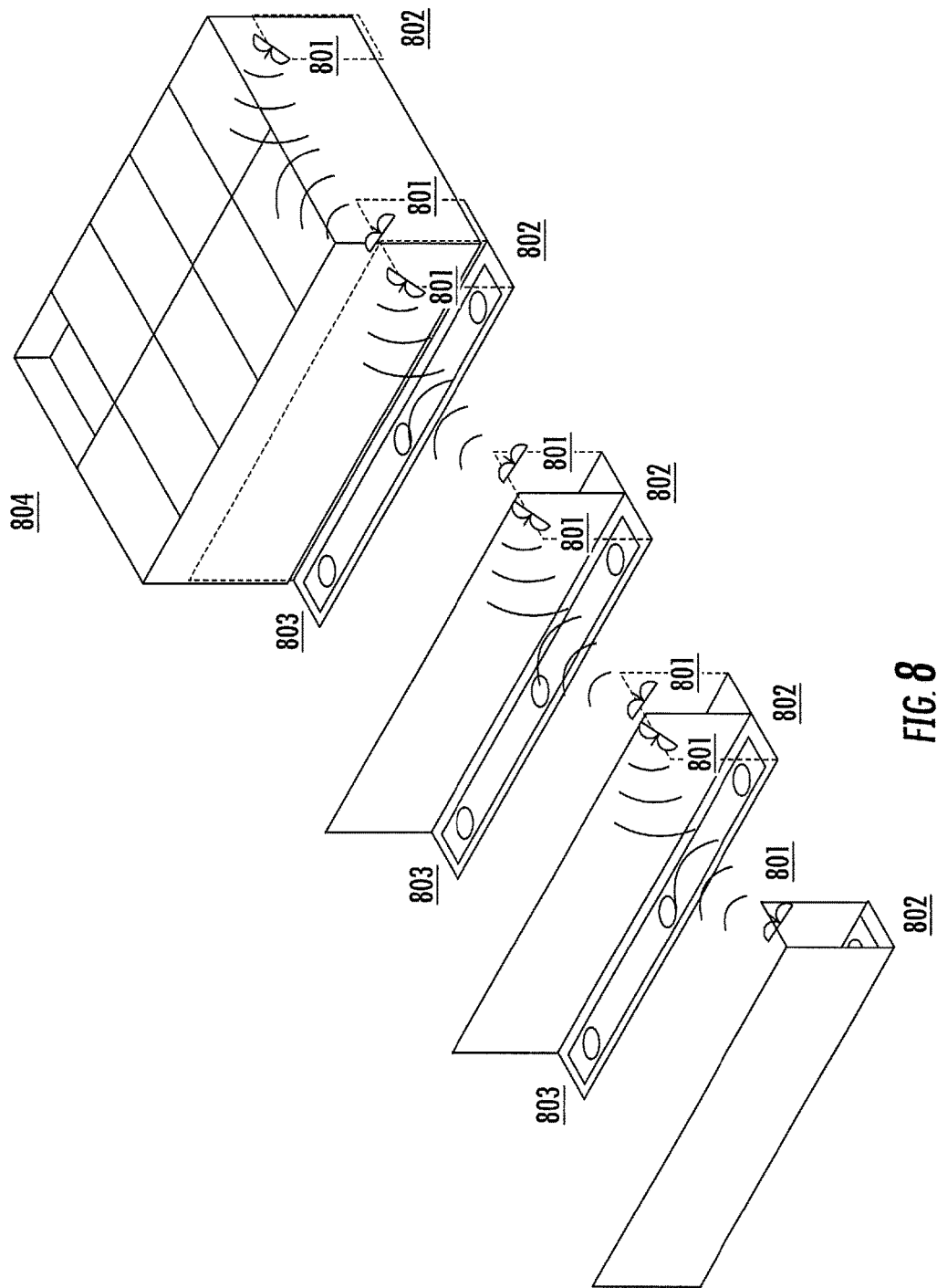
FIG. 8 is a schematic diagram illustrating the combining of measurements from electromagnetic beam sensors with measurements from weight sensors according to an embodiment of the subject matter described herein.

For example, FIG. 8 shows reflectance sensors 801 mounted at an angle to the vertical on dividers 802. The same dividers also support weight sensors 803 which measure the weight of boxes of product 804 in real time. By combining these signals it is possible to further confirm the nature of shopper interactions, for example, whether items were picked up, put back, rearranged, restocked, and/or fully removed. The further use of weight data also reduces possibility of false positives as noted above from ambient lighting. By adding the optical system to a weight based system it is possible to overcome sensitivity to vibrations inherent in weight sensing systems. The net result is a system suitable for high vibration environments and also with variations in ambient lighting.

In some embodiments, sensors may be installed to survey the area in front of a peg hook.

Figure 9C:
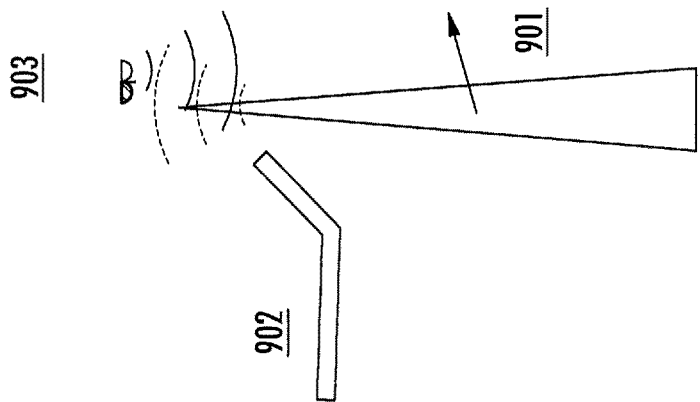
FIGS. 9A-9C are schematic diagrams illustrating an electromagnetic beam sensor mounted near a peg hook to detect insertion and removal of a product from the peg hook according to an embodiment of the subject matter described herein.
Figure 9B:
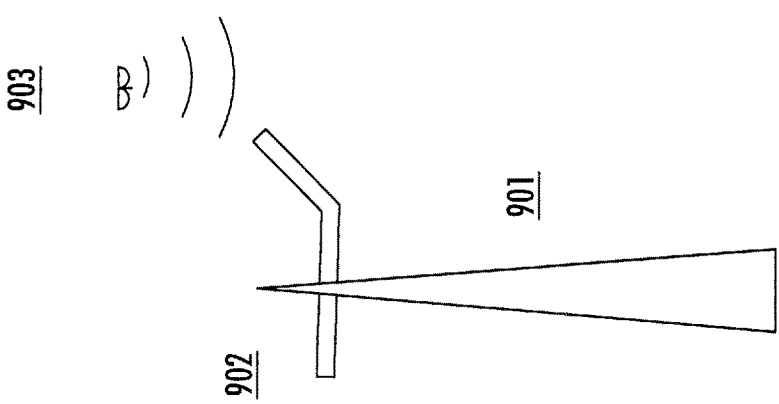
Figure 9A:
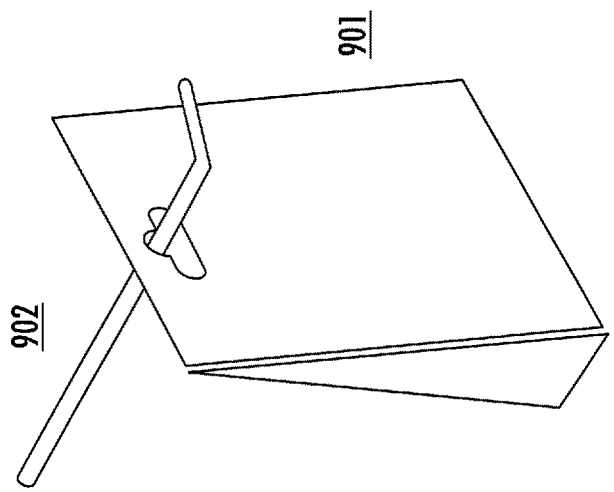

For example, FIG. 9A shows an item of product 901 suspended on a peg hook 902. FIG. 9B shows a reflectance sensor 903 mounted above and in front of the peg hook. FIG. 9C shows item 901 being removed from peg hook 902 and reflecting the beam from sensor 903, so allowing detection of the item's removal.

In some embodiments, sensors may be installed to measure removal of items such as bottles that may be typically stored in a cell array.

For example, FIG. 10A shows an item 1001 stored in a cell array 1002. In FIG. 10B an infrared sensor 1003 may be installed within the cell array 1002—when items are present the beam is reflected. FIG. 10c shows item 1001 being removed from the cell array—as the bottom of item is removed; the beam from sensor 1003 will no longer be reflected, allowing detection of the removal.

In some embodiments, sensors may be installed to survey the area in front of items (for example, bottles) that may be mounted on a track where product items are pushed forward to the front of the shelf by gravity or by spring loading.

Figure 11A:
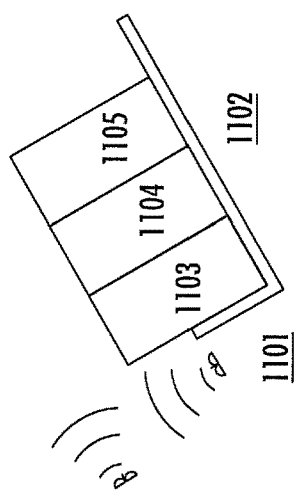
FIGS. 11A-11F are schematic diagrams illustrating sensor placement at or near a gravity feed or pusher track to detect product insertion and removal from the gravity feed or pusher track according to an embodiment of the subject matter described herein.
Figure 11B:
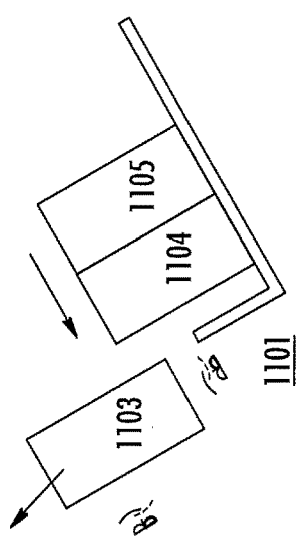
Figure 11C:
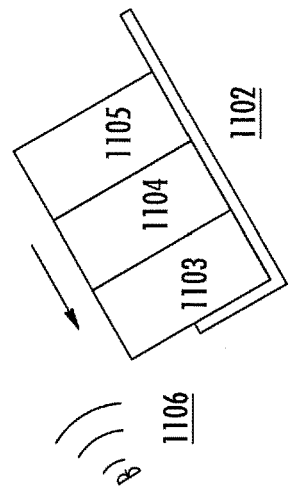
Figure 11D:
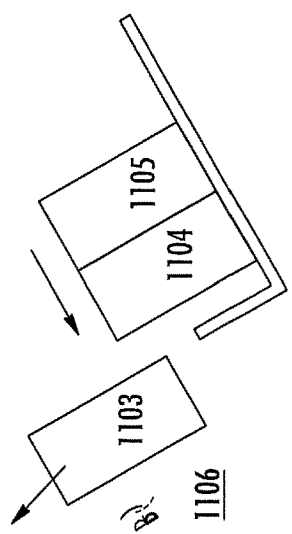

For example, in FIG. 11A, a reflectance sensor 1101 is installed in front of a push-forward track 1102 on which items 1103, 1104 and 1105 are mounted. In FIG. 11B, item 1103 is being removed from the track, breaking the beam of sensor 1101. As item 1103 is removed, items 1104, 1105 and any subsequent items are advanced on track 1102 either by gravity or spring loading.

In FIG. 11, shown is example alternative reflectance sensor 1106 that is mounted in front of and above track 1102 so that its beam is normally clear. In FIG. 11D, when an object 1103 is removed from the track, the sensor beam is reflected allowing detection of the activity.

Figure 11E:
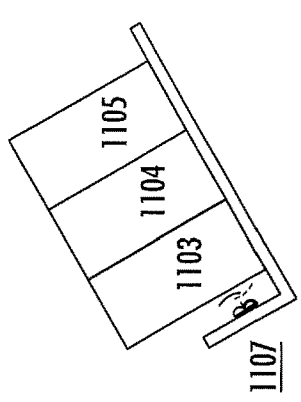
Figure 11F:
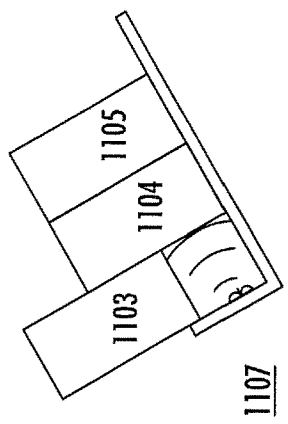

In FIG. 11E an alternative reflectance sensor 1107 is mounted inside track 1102 so that its beam is normally reflected. In FIG. 11F when an object 1103 is removed from the track, the sensor beam is temporarily clear, producing a more distant reflection on object 1104, so allowing detection of the activity. Note that this particular sensor positioning could also be achieved with the sensor positioned on the base of the track so as to reflect off the bottom of container 1103. This could also be achieved with a micro switch.

In some embodiments, sensors may be installed to detect items that may be merchandised in drawers. In FIG. 12A sensor 1201 may be installed inside a drawer 1202 housing multiple items of product 1203 and 1204 and secured inside a merchandising unit 1205. When the drawer is closed, the beam is reflected. In FIG. 12B, drawer 1202 has been opened to allow removal of product 1204. The reflection of the beam from sensor 1204 is more distant and magnitude of reflection is reduced, allowing detection of the drawer opening. By measuring the reflection magnitude, the distance to which the drawer was opened may be computed, which in some cases can be used to identify what position product was removed from the drawer.

In some embodiments, infrared sensors may be installed to gather information on other shopper activities in store.

Figure 13B:
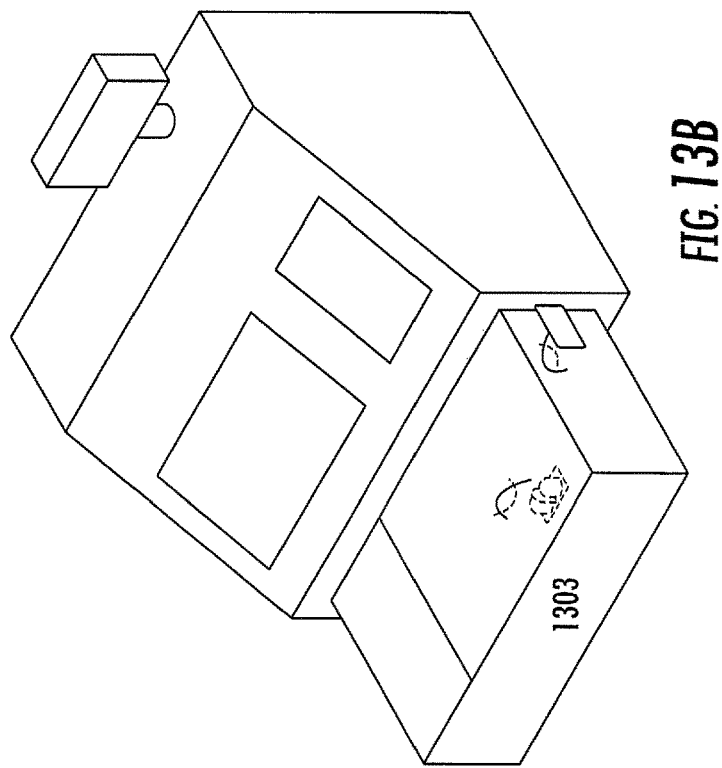
FIGS. 13A and 13B are schematic diagrams illustrating the positioning of electromagnetic beam sensors near a cash register drawer to detect opening and closing of the drawer according to an embodiment of the subject matter described herein.
Figure 13A:
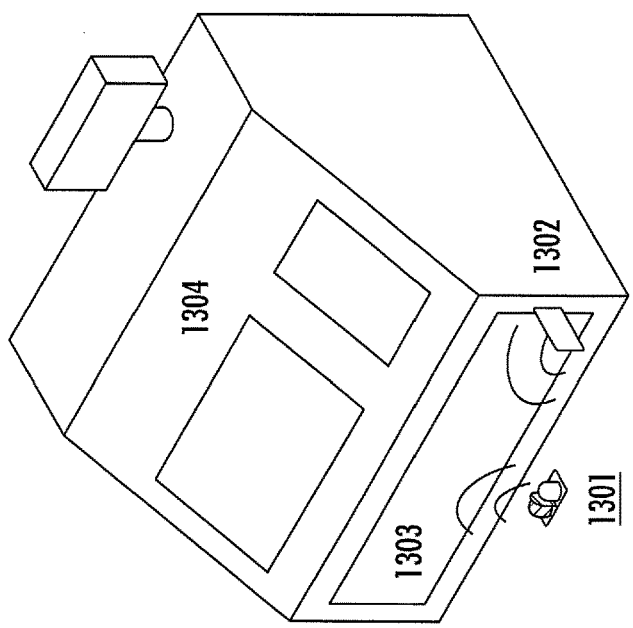

For example, in the arrangement shown in FIG. 13A reflectance sensors 1301 and 1302 may be positioned such that their beams cross the path of a cash drawer 1303 on a cash register 1304. When the drawer is closed, the beams are not reflected. In FIG. 13B case drawer 1303 is open, obscuring the beams of sensor 1301 and 1302 and allowing detection of a transaction event. Either sensor position 1302 and/or 1301 may be used.

Figure 14A:
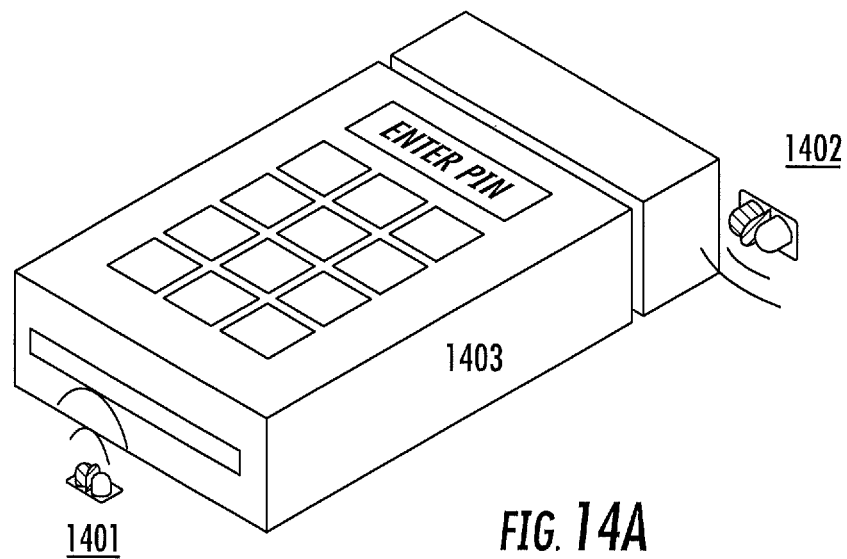
FIGS. 14A and 14B are schematic diagrams illustrating the positioning of electromagnetic beam sensors in the motion path of a credit card reader according to an embodiment of the subject matter described herein.
Figure 14B:
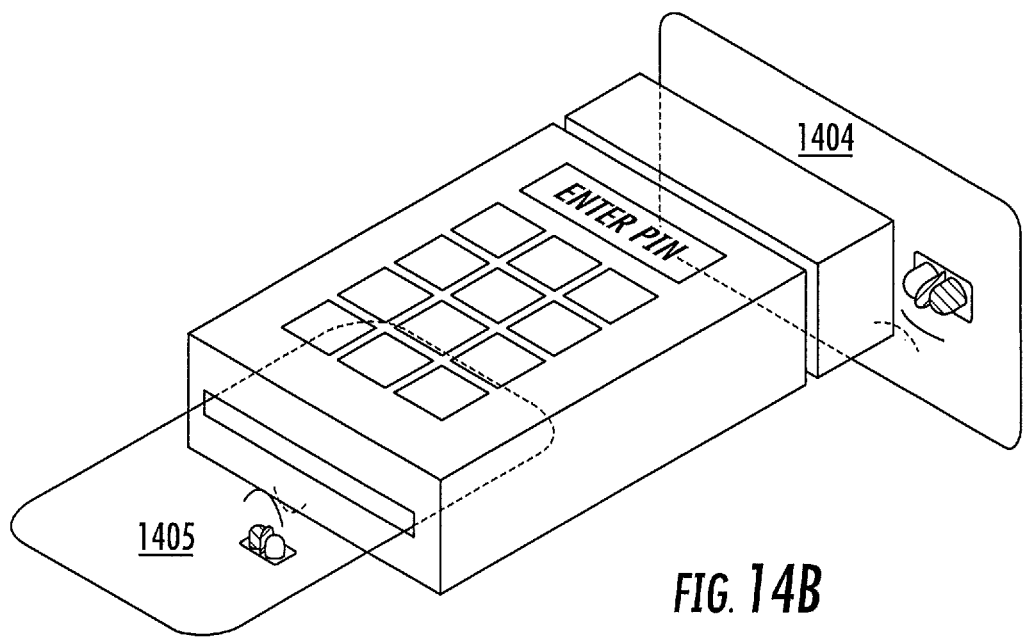

In the arrangement shown in FIG. 14A reflectance sensors 1401 and 1402 may be positioned such that their beams cross the motion path of credit card reader 1401. In FIG. 14B, credit cards 1404 and 1405 have been introduced into the credit card reader, obscuring the beams of sensors 1401 and 1402 and allowing detection of a transaction event.

In the arrangement shown in FIG. 15A reflectance sensor 1501 may be positioned such that its beam crosses the motion path of a paper strip 1502 in a receipt printer 1503. In FIG. 15B, when paper strip 1502 advances, the sensor beam is reflected, allowing detection of a transaction event. In FIG. 15C, multiple sensors 1504 and 1503 are positioned with beams crossing the paper path. In the example shown, sufficient paper has advanced to obscure sensors 1504 and 1505 but not 1506. By comparing which sensors are obscured vs. not, it is possible to measure the amount of paper removed which will give some indication of size of transaction.

Figure 16:
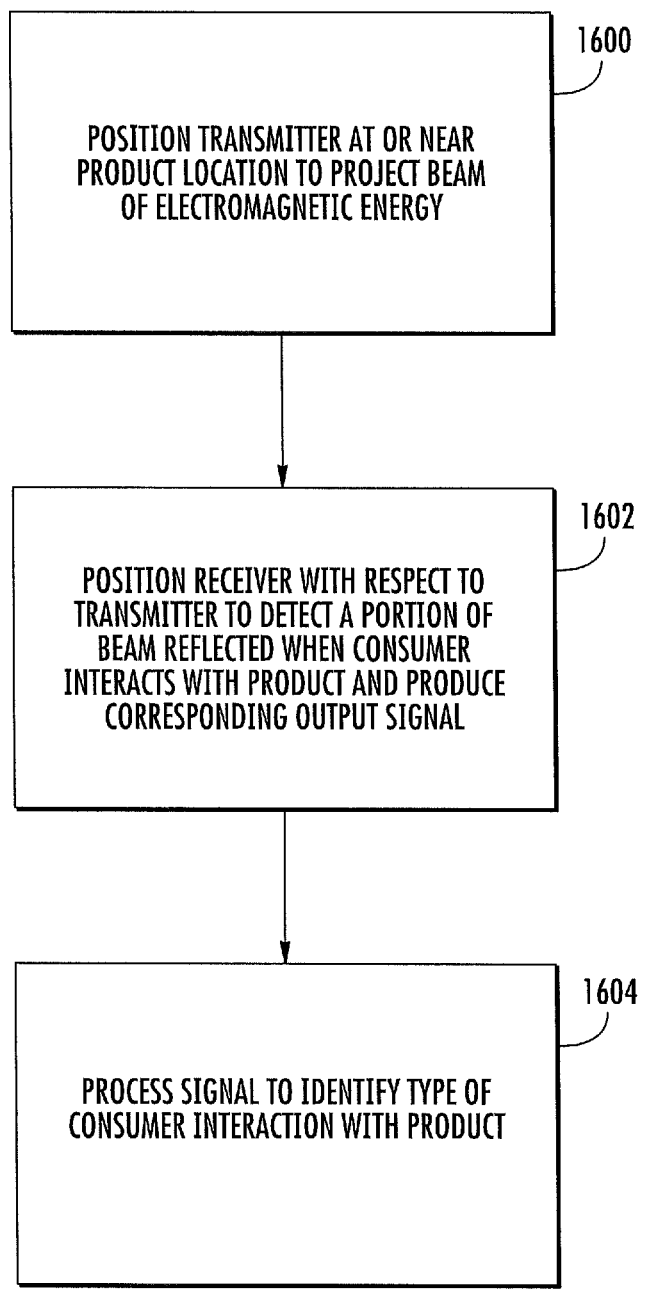
FIG. 16 is a flow chart illustrating an exemplary process to tracing user interactions with products using electromagnetic beam sensors according to an embodiment of the subject matter described herein.

FIG. 16 is a flow chart illustrating user interactions with products using electromagnetic beam sensors according to an embodiment of the subject matter described herein. Referring to FIG. 16, in step 1600, at least one transmitter for projecting a beam of electromagnetic energy is positioned at or near a product location. In step 1602, At least one receiver is positioned with respect to the at least one transmitter to detect a portion of the beam reflected when a consumer interacts with a product and to produce a corresponding output signal. In step 1604, the signal produced by the at least one receiver is processed to identify a type of consumer interaction with the product.

The above-disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A system for reducing false positives caused by ambient lighting on infra-red sensors, and false positives caused by background vibrations on weight sensors, the system comprising:
    at least one inventory zone, within which weight sensors measure weight of at least one retail product; and
    at least two infra-red sensors, each respectively comprising a transmitter and a receiver, and mounted in or near the at least one inventory zone, wherein:
        a volume of space surrounding each of the at least two infra-red sensors configured as a detection zone of the at least one inventory zone from within which each receiver of each of the at least two infra-red sensors measures a respective reflection of a consumer's hand,
        the first transmitter of the first infra-red sensor is configured to project a first beam of electromagnetic energy,
        a first portion of the first electromagnetic energy beam is reflected from the consumer's hand interacting with the at least one retail product,
        the first receiver of the first infra-red sensor is configured to receive the first portion of the first electromagnetic energy beam emitted from the first transmitter,
        the received first portion of the first electromagnetic energy beam is used to measure a first distance from the first infra-red sensor to a first edge of the consumer's hand,
        the second transmitter of the second infra-red sensor of the at least two infra-red sensors is configured to project a second beam of electromagnetic energy,
        a second portion of the second electromagnetic energy beam is reflected from the consumer's hand interacting with the at least one retail product,
        the second receiver of the second infra-red sensor is configured to receive the second portion of the electromagnetic energy beam emitted from the second transmitter,
        the received second portion of the second electromagnetic energy beam is used to measure a second distance from the second infra-red sensor to a second edge of the consumer's hand,
        the measured first and second distances of the consumer's hand interacting with the at least one retail product are analyzed to identify a position of the consumer's hand,
        and the analyzed distances of the first and second infra-red sensors are combined with the measured weight of the at least one retail product by the weight sensors to reduce both the false positives caused by ambient lighting on the first and second infra-red sensors as well as the false positives caused by background vibrations on the weight sensors.

2. The system of claim 1 where the infra-red sensors are triangulation sensors.

3. The system of claim 1 where the infra-red sensors are reflectance sensors.

4. The system of claim 1 further comprising at least one circuit board on which the at least two infra-red transmitters and the at least two infra-red receivers are mounted, the at least one circuit board being configured to mount at or near a location of the at least one product.

5. The system of claim 4 wherein the at least two transmitters are configured to project the beams of electromagnetic energy in a plane parallel to a plane of the at least one circuit board.

6. The system of claim 4 wherein the at least one circuit board is configured to mount inside a shelf lip between the shelf lip and product containers.

7. The system of claim 1 where the measured first and second distances of the consumer's hand interacting with the at least one retail product are analyzed to further identify a size of the at least one retail product or the consumer's hand.

8. The system of claim 1, wherein changes in the reflected beam are analyzed to determine a type of the interaction including at least whether or not the at least one retail product has been picked up or put back.

9. The system of claim 1, wherein the position of the consumer's hand is used to determine the inventory zone from which the at least one retail product was picked up.

10. A method for reducing false positives caused by ambient lighting on infra-red sensors, and false positives caused by background vibrations on weight sensors, the method comprising:
    mounting, within or near at least one inventory zone, weight sensors for measuring weight of at least one retail product
    mounting, in or near at least one inventory zone, at least two infra-red sensors, each respectively comprising a transmitter and a receiver;
    configuring a volume of space surrounding each of the at least two infra-red sensors as a detection zone of the at least one inventory zone from within which each receiver of each of the at least two infra-red sensors measures a respective reflection of a consumer's hand;
    projecting a first beam of electromagnetic energy, by a first transmitter of a first infra-red sensor of the at least two infra-red sensors;
    reflecting a first portion of the first electromagnetic energy beam from the consumer's hand interacting with the at least one retail product;
    receiving, by a first receiver of the first infra-red sensor, the first portion of the first electromagnetic energy beam emitted from the first transmitter;
    measuring, by the first infra-red sensor, using the received first portion of the first electromagnetic energy beam, a first distance from the first infra-red sensor to a first edge of the consumer's hand;
    projecting a second beam of electromagnetic energy, by a second transmitter of a second infra-red sensor of the at least two infra-red sensors;
    reflecting a second portion of the second electromagnetic energy beam from the consumer's hand interacting with the at least one retail product;
    receiving, by a second receiver of the second infra-red sensor, the second portion of the electromagnetic energy beam emitted from the second transmitter;
    measuring, by the second infra-red sensor, using the received second portion of the second electromagnetic energy beam, a second distance from the second infra-red sensor to a second edge of the consumer's hand;

analyzing the measured first and second distances of the consumer's hand interacting with the at least one retail product, to identify a position of the consumer's hand;

combining the analyzed distances of the first and second infra-red sensors with the measured weight of the at least one retail product by the weight sensors to reduce both the false positives caused by ambient lighting on the first and second infra-red sensors as well as the false positives caused by background vibrations on the weight sensors.

* * * * *